United States Patent
Nakatani et al.

(10) Patent No.: US 8,238,215 B2
(45) Date of Patent: *Aug. 7, 2012

(54) RECORDING MEDIUM, AND RECORDING AND REPRODUCING APPARATUS

(75) Inventors: Morio Nakatani, Ichinomiya (JP); Kenji Nagatomi, Kaizu (JP); Yoshiyuki Matsumura, Anpachi-Gun (JP); Seiichiro Takahashi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 34 days.

This patent is subject to a terminal disclaimer.

(21) Appl. No.: 12/541,648

(22) Filed: Aug. 14, 2009

(65) Prior Publication Data

US 2009/0303854 A1 Dec. 10, 2009

Related U.S. Application Data

(63) Continuation of application No. PCT/JP2008/051793, filed on Feb. 4, 2008.

(30) Foreign Application Priority Data

Feb. 16, 2007 (JP) ................................. 2007-036894

(51) Int. Cl.
*G11B 7/20* (2011.01)

(52) U.S. Cl. ......................................................... 369/94

(58) Field of Classification Search ....................... 369/94
See application file for complete search history.

(56) References Cited

U.S. PATENT DOCUMENTS

| | | | | |
|---|---|---|---|---|
| 4,908,813 A * | 3/1990 | Ojima et al. | ..................... | 369/94 |
| 5,408,453 A * | 4/1995 | Holtslag et al. | ............ | 369/44.23 |
| 5,526,338 A * | 6/1996 | Hasman et al. | .................. | 369/94 |
| 5,872,723 A * | 2/1999 | DeCusatis et al. | ............ | 700/306 |
| 6,160,787 A * | 12/2000 | Marquardt et al. | ........ | 369/275.1 |
| 6,327,240 B1 * | 12/2001 | Tobita et al. | ............... | 369/53.19 |
| 6,540,397 B2 * | 4/2003 | Yoshinari et al. | ............. | 368/286 |
| 6,574,174 B1 * | 6/2003 | Amble et al. | ............... | 369/44.26 |
| 7,626,913 B2 * | 12/2009 | Usami | ........................... | 369/103 |
| 7,715,285 B2 * | 5/2010 | Maegawa | ................... | 369/44.13 |
| 7,746,752 B2 * | 6/2010 | Ogawa | ......................... | 369/103 |
| 7,848,205 B2 * | 12/2010 | Shiono et al. | ............ | 369/112.01 |

(Continued)

FOREIGN PATENT DOCUMENTS

EP 1526521 A2 * 4/2005

(Continued)

OTHER PUBLICATIONS

International Preliminary Report on Patentability for PCT/JP2008/051793, dated Oct. 15, 2009, pp. 1-18.

(Continued)

*Primary Examiner* — Aristotelis Psitos

(74) *Attorney, Agent, or Firm* — Ditthavong Mori & Steiner, P.C.

(57) ABSTRACT

A recording medium includes: at least one recording layer on which information is recorded by multi-photon absorption; and a servo layer disposed in a laminated direction with respect to the recording layer and having a track for guiding a beam spot of laser light having a first wavelength and a beam spot of laser light having a second wavelength along a scanning trajectory, wherein the servo layer and the at least one recording layer constitute a set of layers, and a plurality of sets of layers is formed in the laminated direction.

5 Claims, 13 Drawing Sheets

U.S. PATENT DOCUMENTS

| | | | |
|---|---|---|---|
| 7,969,853 B2 * | 6/2011 | Nakatani et al. | 369/112.24 |
| 2005/0094507 A1 | 5/2005 | Ogasawara | |
| 2005/0169159 A1 | 8/2005 | Tamura et al. | |
| 2006/0072438 A1 * | 4/2006 | Nishino et al. | 369/275.1 |
| 2006/0233087 A1 * | 10/2006 | Usami | 369/103 |
| 2007/0076548 A1 | 4/2007 | Maegawa | |

FOREIGN PATENT DOCUMENTS

| | | |
|---|---|---|
| JP | 11-16216 A | 1/1999 |
| JP | 2002-63738 A | 2/2002 |
| JP | 2004-335060 A | 11/2004 |
| JP | 2005-85437 A | 3/2005 |
| JP | 2005-122862 A | 5/2005 |
| JP | 2005-302263 A | 10/2005 |
| JP | 2006-196125 A | 7/2006 |
| JP | 2006-260669 A | 9/2006 |
| JP | 2007-200427 A | 8/2007 |

OTHER PUBLICATIONS

International Search report dated Apr. 1, 2008 for corresponding application No. PCT/JP2008/051793.

International Preliminary Report on Patentability dated May 14, 2009, for corresponding application No. PCT/JP2008/051793.

* cited by examiner

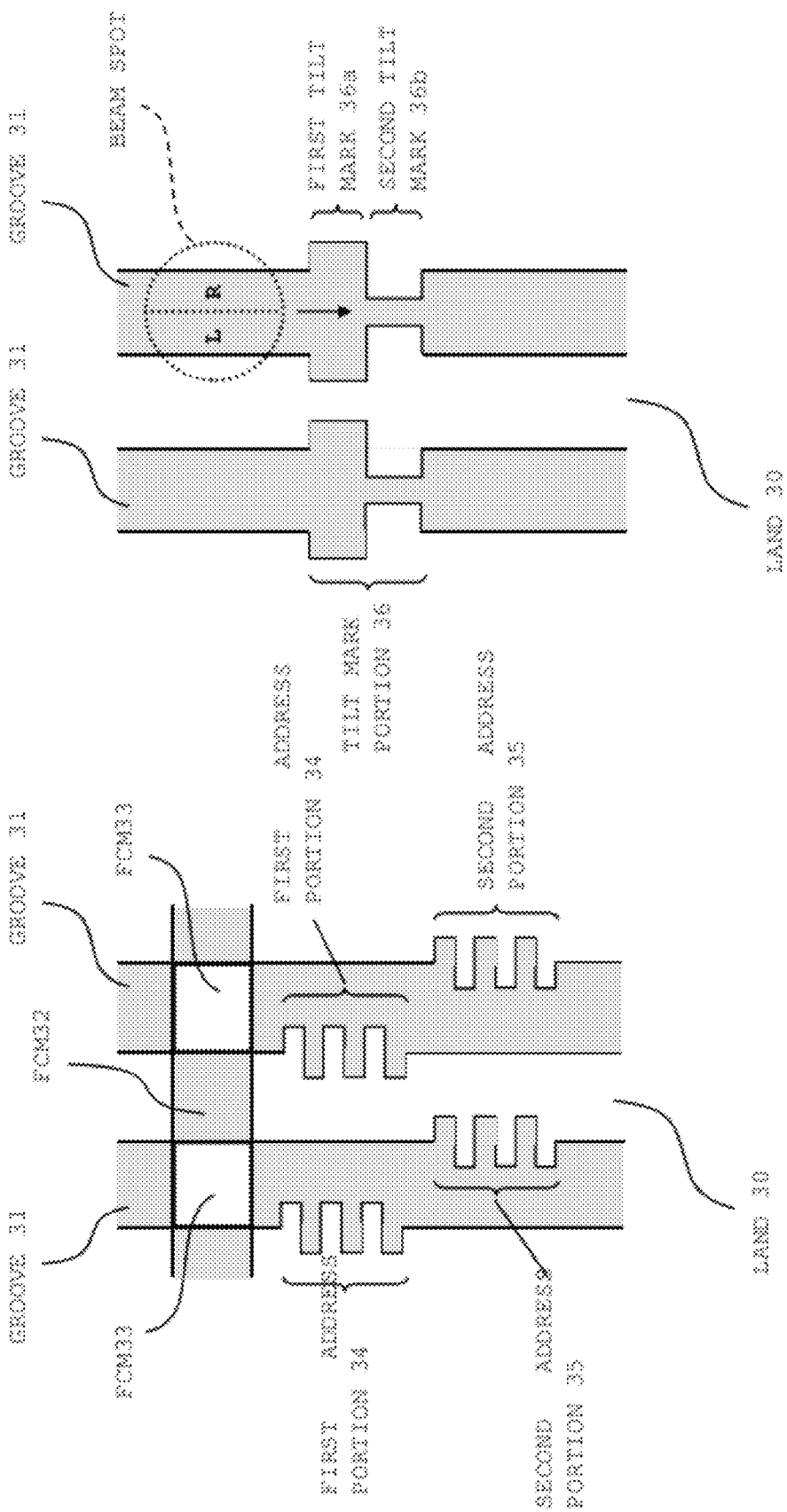

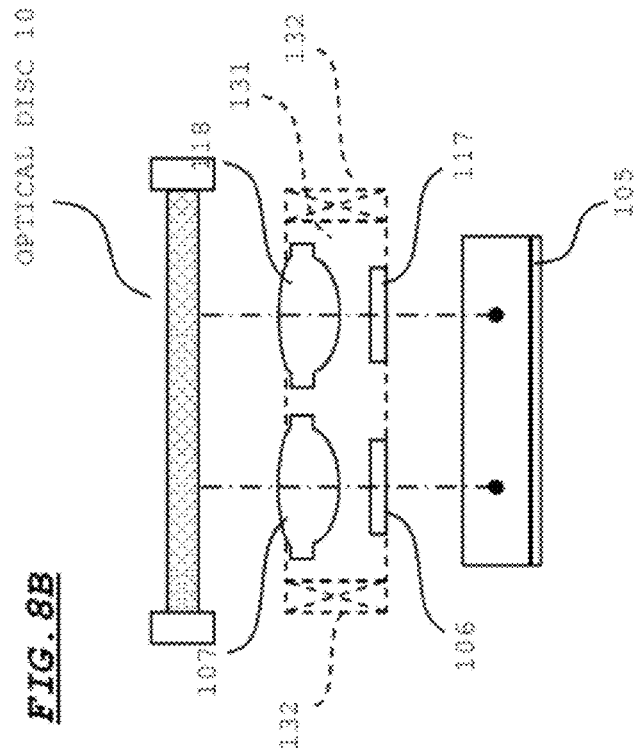
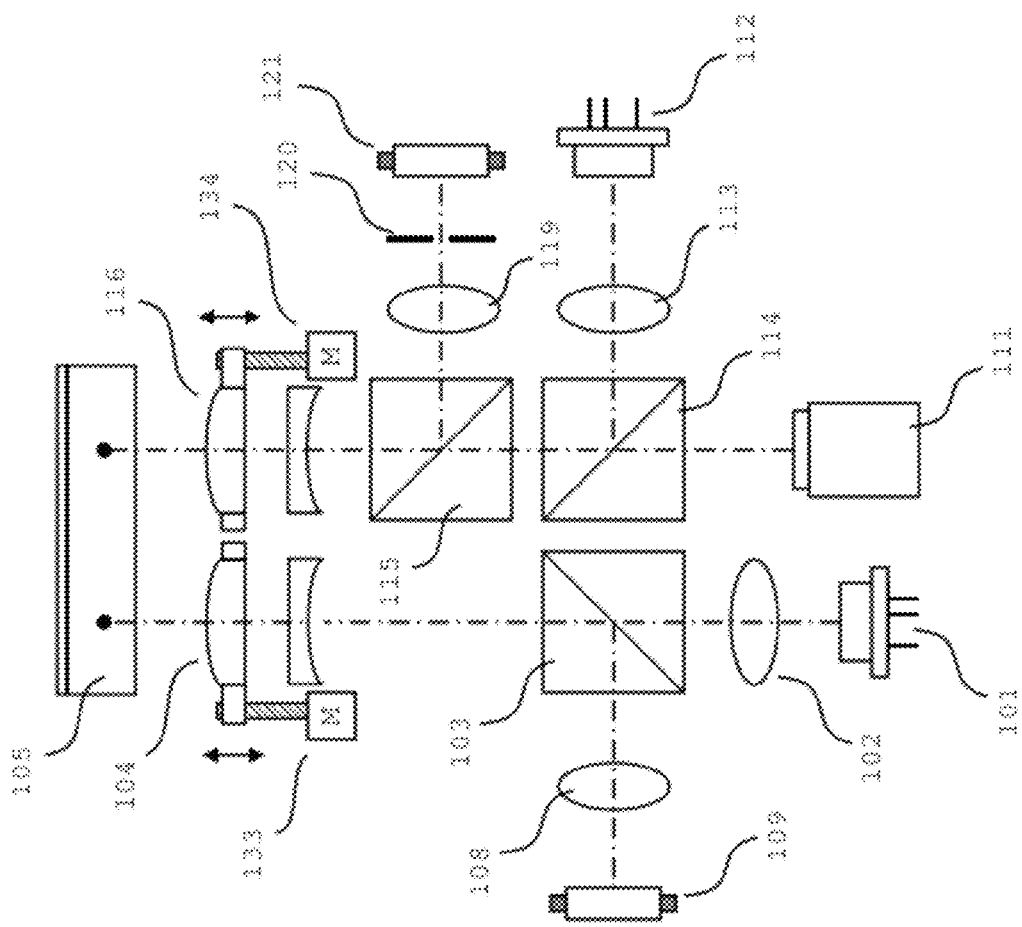
FIG. 8A
FIG. 8B

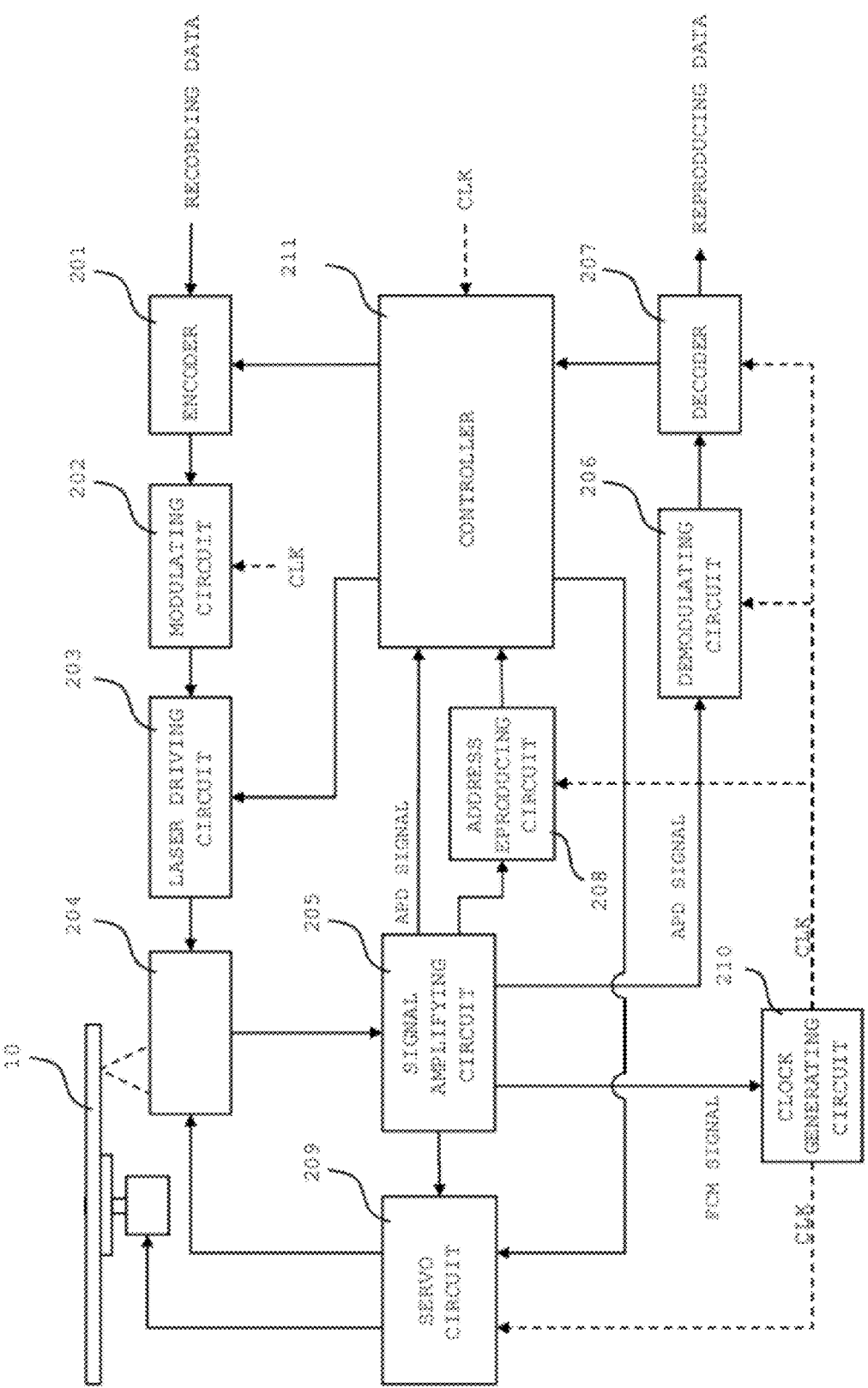

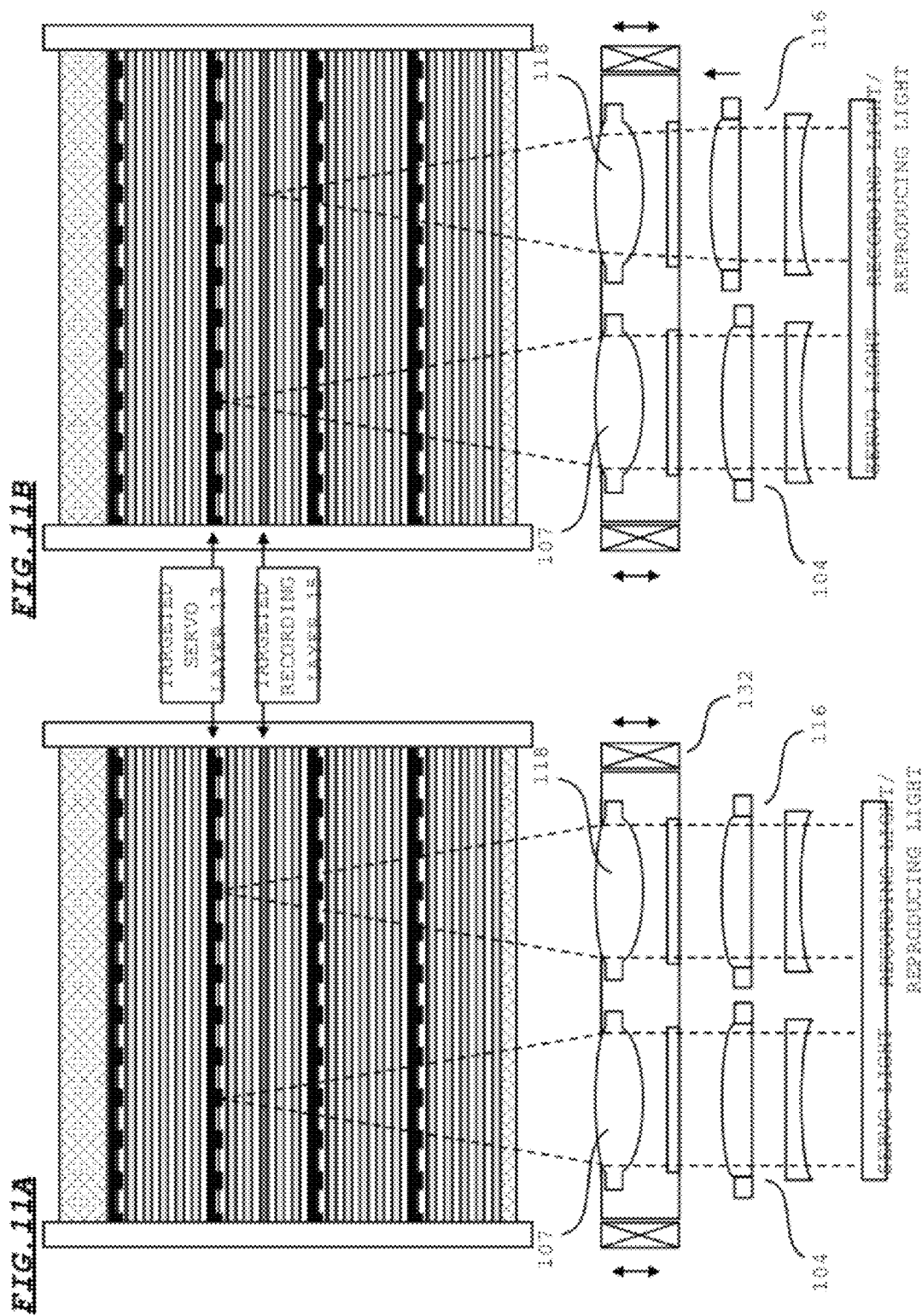

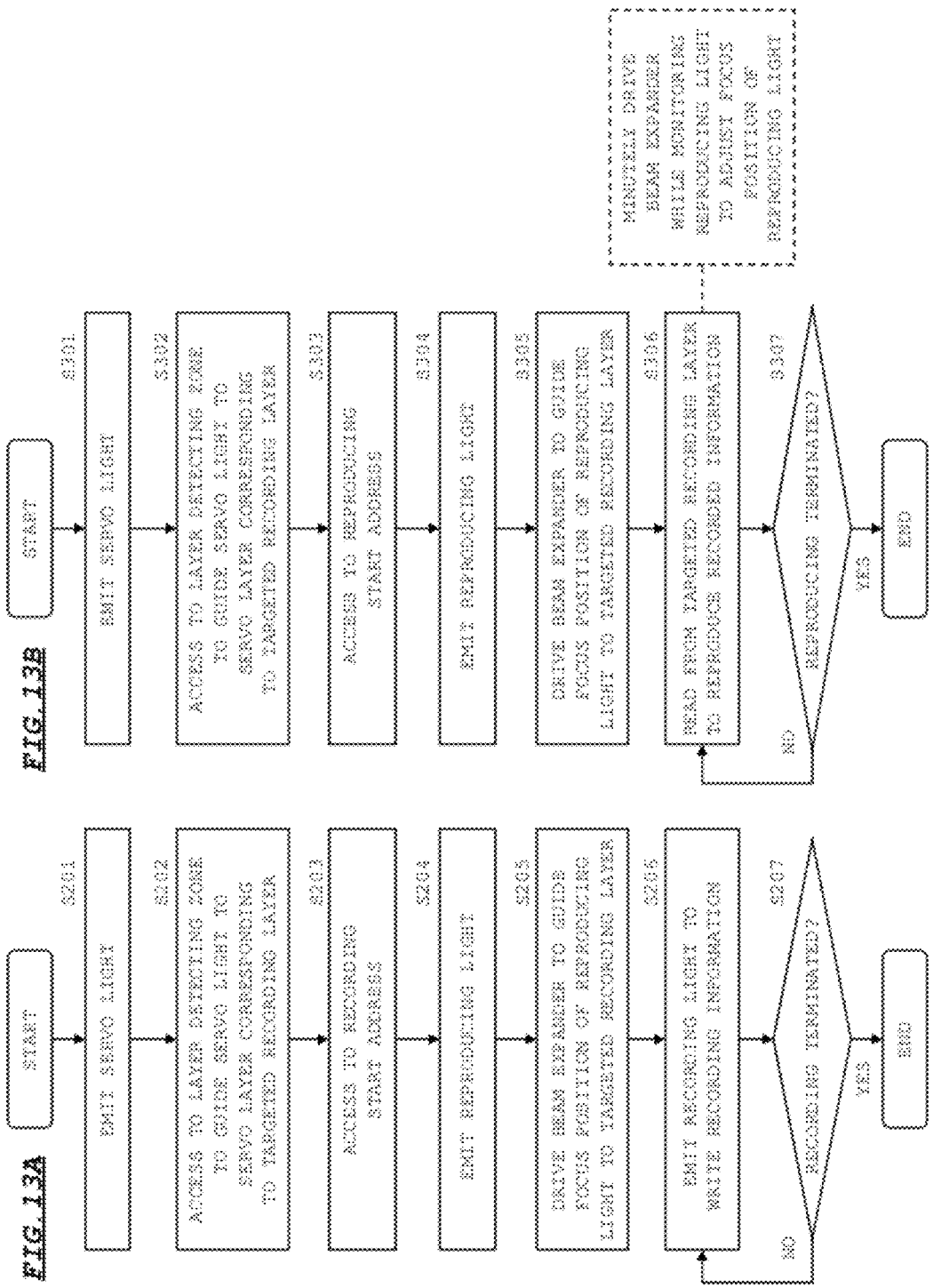

RECORDING MEDIUM, AND RECORDING AND REPRODUCING APPARATUS

This application is a continuation of PCT/JP2008/051793, filed on Feb. 4, 2008, which was published under PCT Article 21(2).

This application claims priority under 35 U.S.C. Section 119 of Japanese Patent Application No. 2007-036894 filed Feb. 16, 2007, entitled "RECORDING MEDIUM, AND RECORDING AND REPRODUCING APPARATUS". The disclosers of the above applications are incorporated herein by reference.

BACKGROUND OF THE INVENTION

1. Field of the Invention

The present invention relates to a recording medium and a recording and reproducing apparatus, and more particularly to a multilayer recording medium having a plurality of recording layers for recording information by multi-photon absorption in a laminated direction, and a recording and reproducing apparatus compatible with the multilayer recording medium.

2. Description of the Related Art

In recent years, as the capacity of a recording medium is increased, there has been developed an optical recording medium having a plurality of recording layers in a laminated direction. For instance, the optical recording medium may have an arrangement that the plurality of recording layers and one servo layer are laminated. In this recording medium, a flat recording layer without a guide track is formed, and a servo layer having a guide track is formed on the recording layer. In this arrangement, in performing a recording/reproducing operation, a focusing servo signal and a tracking servo signal are generated based on the guide track formed in the servo layer. Controlling the position of a beam spot on the recording layer based on the servo signals allows the beam spot to scan the recording layer along an intended scanning trajectory.

The recording medium having the above arrangement is advantageous in increasing the capacity of the recording medium by increasing the number of recording layers to be laminated. On the other hand, however, increasing the number of recording layers to be laminated may result in increasing the distance between a servo layer and a recording layer in the laminated direction. As a result, a relation between the recording layer and the servo layer may become weak, and reliability of a servo signal with respect to the recording layer may be lowered. Thus, the recording medium has a limit on the number of recording layers to be laminated, which resultantly restricts the recording capacity.

SUMMARY OF THE INVENTION

In view of the above, an object of the present invention is to provide a recording medium capable of effectively increasing the capacity of the recording medium, and a reproducing apparatus for the recording medium. Another object of the present invention is to provide a structure of a recording medium capable of smoothly performing servo control of laser light with respect to a recording layer, and recording/reproducing information with respect to the recording layer, and a reproducing apparatus for the recording medium.

A recording medium according to a first aspect of the present invention includes: at least one recording layer on which information is recorded by multi-photon absorption; and a servo layer disposed in a laminated direction with respect to the recording layer and having a track for guiding a beam spot of laser light having a first wavelength and a beam spot of laser light having a second wavelength along a scanning trajectory. The servo layer and the at least one recording layer constitute a set of layers, and a plurality of sets of layers is formed in the laminated direction.

A second aspect of the present invention is directed to a recording and reproducing apparatus for recording and reproducing information on and from a recording medium. According to this aspect, the recording medium includes at least one recording layer on which information is recorded by multi-photon absorption, and a servo layer disposed in a laminated direction with respect to the recording layer and having a track for guiding a beam spot of laser light having a first wavelength and a beam spot of laser light having a second wavelength along a scanning trajectory, the servo layer and the at least one recording layer constituting a set of layers, and a plurality of sets of layers being formed in the laminated direction. The recording and reproducing apparatus according to this aspect includes an optical pickup device, and a servo circuit for controlling the optical pickup device. The optical pickup device includes: an optical system for irradiating the laser light having the first wavelength, the laser light having the second wavelength, and laser light having a third wavelength for scanning the servo layer on the recording medium, and guiding reflection light for reproducing and reflection light of the laser light having the third wavelength, out of reflection light of the laser light having the first wavelength, the laser light having the second wavelength, and the laser light having the third wavelength from the recording medium, to a corresponding photodetector; and an actuator for causing the laser light having the first wavelength and the laser light having the second wavelength to follow the recording layer, and causing the laser light having the third wavelength to follow the servo layer. The servo circuit is operable to position the laser light having the third wavelength on the track on the servo layer, based on a detection signal from the photodetector for receiving the laser light having the third wavelength, and generate a servo signal for causing the laser light having the first wavelength and the laser light having the second wavelength to scan along the scanning trajectory on the recording layer to be recorded or reproduced so as to supply the servo signal to the actuator.

BRIEF DESCRIPTION OF THE DRAWINGS

Above and other objects, and novel features of the present invention will become more apparent upon reading the following detailed description of the embodiment along with the accompanying drawings.

FIGS. 6A and 6B are plan views showing the structure of the groove area in the servo layer in accordance with the embodiment of the present invention.

FIGS. 8A and 8B are diagrams showing an arrangement (optical system) of an optical pickup device in accordance with the embodiment of the present invention.

FIG. 10 is a diagram showing an arrangement of an optical disc apparatus in accordance with the embodiment of the present invention.

FIGS. 11A and 11B are conceptual diagrams showing recording and reproducing operations in accordance with the embodiment of the present invention.

FIGS. 13A and 13B are flowcharts showing recording and reproducing operations in accordance with the embodiment of the present invention.

Figure 1:
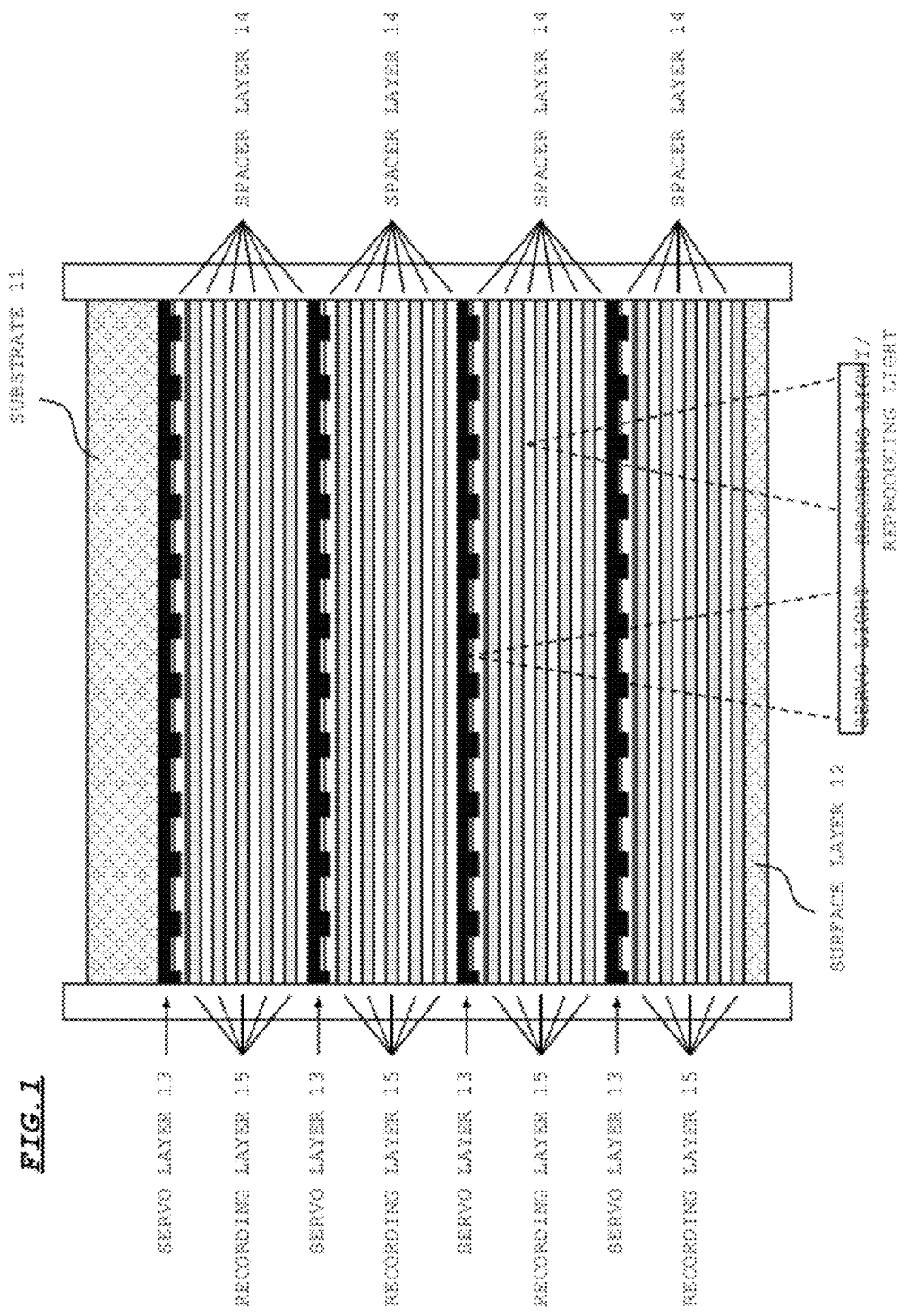
FIG. 1 is a diagram showing a sectional structure of an optical disc in accordance with an embodiment of the present invention.

The drawings are provided mainly for describing the present invention, and do not limit the scope of the present invention.

DESCRIPTION OF THE PREFERRED EMBODIMENTS

In the following, an embodiment of the present invention is described referring to the drawings. The embodiment is an example, wherein the present invention is applied to a multi-layer optical disc, an optical pickup device compatible with the optical disc, and an optical disc apparatus compatible with the optical disc.

The term "multi-photon absorption" recited in the claims of the present invention indicates a phenomenon that a material is excited by absorbing two or more photons. The probability of occurrence of multi-photon absorption is proportional to the square of an incident light intensity (non-linear optical effect). In other words, multi-photon absorption is induced solely in an area where the energy of incident light is concentrated. Condensing incident light through a lens enables to generate a condition that multi-photon absorption occurs solely on a focal point including its vicinity, whereas multi-photon absorption does not occur in the other space where light is not focused. Specifically, multi-photon absorption can be induced in a multi-photon absorbing material by condensing and irradiating laser light having an absorption wavelength bandwidth of the multi-photon absorbing material with an ultra-short pulse and a high intensity. There is also proposed a method for inducing multi-photon absorption in a multi-photon absorbing material by condensing and irradiating laser light having an absorption wavelength bandwidth of the multi-photon absorbing material, while irradiating light of a wavelength other than the absorption wavelength bandwidth. In the latter method, the energy level of the multi-photon absorbing material is raised by the light of the wavelength other than the absorption wavelength bandwidth. Accordingly, multi-photon absorption is induced, even if the intensity level of laser light having the absorption wavelength bandwidth is suppressed to some extent.

In the embodiment, in performing a recording operation, reproducing laser light is irradiated on a recording layer simultaneously with recording laser light to induce two-photon absorption in the recording layer.

First, FIG. 1 shows a sectional structure of an optical disc 10 in accordance with the embodiment.

As shown in FIG. 1, the optical disc 10 is constructed in such a manner that four sets of layers are formed between a substrate 11 and a surface layer 12, wherein each set of layers is constituted of a servo layer 13, six spacer layers 14, and five recording layers 15.

The substrate 11 and the surface layer 12 are each made of a light transmissive material such as polycarbonate, polyolefin, or acrylic resin. A biodegradable material, a UV curable resin, an adhesive film, or the like may be used as a material of the substrate 11 and the surface layer 12.

The servo layer 13 is made of a material having a high reflectance with respect to servo laser light (hereinafter, referred to as "servo light"), and low reflectances with respect to recording laser light (hereinafter, referred to as "recording light") and reproducing laser light ("hereinafter, referred to as "reproducing light"). In the embodiment, red laser light of about 635 nm wavelength is used as servo light, infrared laser light of 800 nm wavelength is used as recording light, and blue laser light of about 450 nm wavelength is used as reproducing light. In view of this, for instance, niobium pentoxide is used as a material of the servo layer 13.

Figure 2:
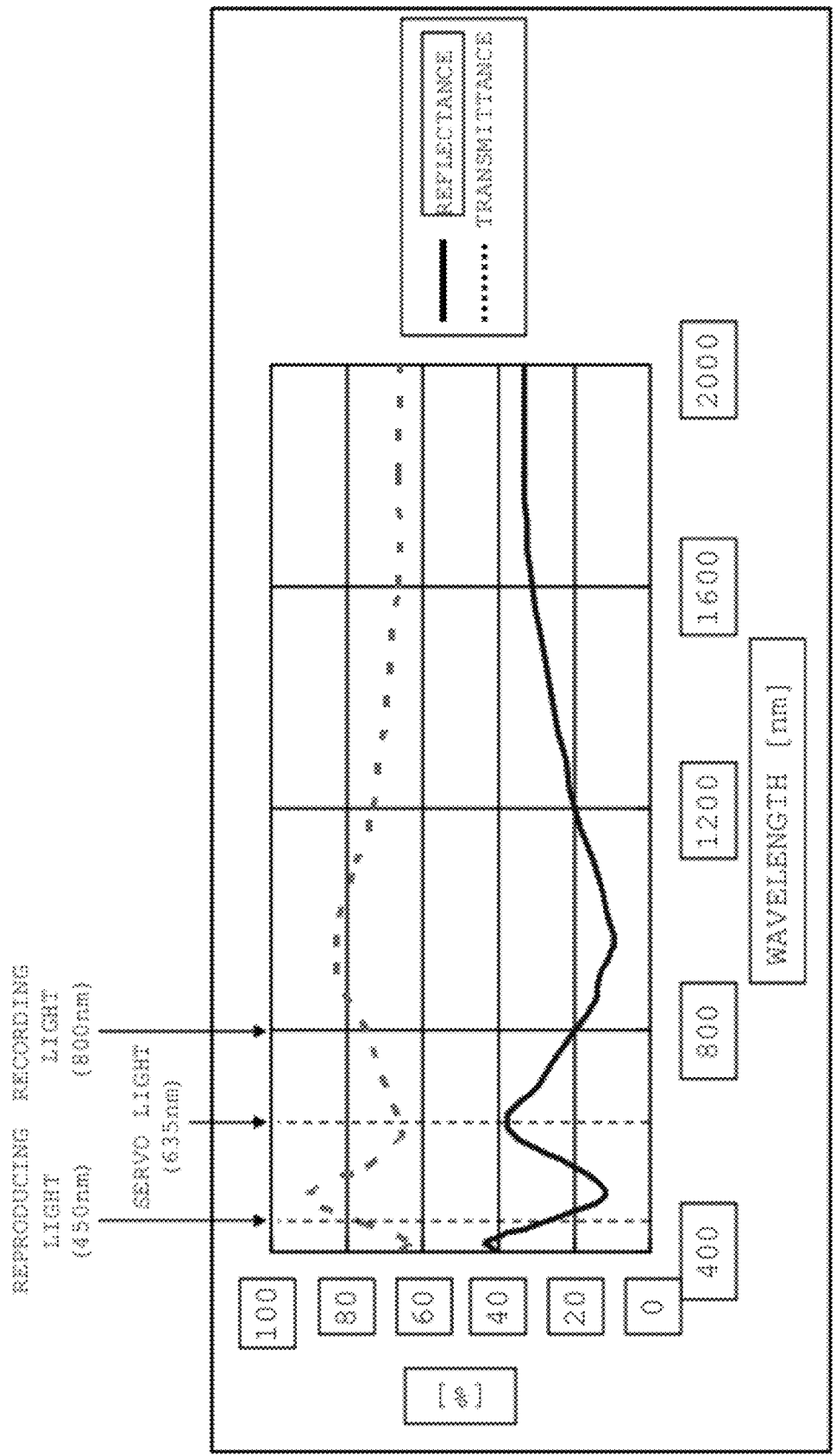
FIG. 2 is a diagram showing an optical characteristic of a servo layer material in accordance with the embodiment of the present invention.

FIG. 2 is a diagram showing an optical characteristic of a film made of niobium pentoxide. As shown in FIG. 2, the film has a high reflectance with respect to light near 635 nm wavelength, and extremely low reflectances with respect to light near 500 nm wavelength and 800 nm wavelength. Accordingly, in the case where the wavelength of servo light is set to 635 nm, and the wavelengths of recording light and reproducing light are respectively set to 450 nm and 800 nm, as described above, the film has a high reflectance with respect to servo light, and low reflectances with respect to recording light and reproducing light.

In this example, niobium pentoxide is used as a material of the servo layer 13. This is because, the wavelengths of servo light, recording light, and reproducing light are respectively set to 635 nm, 800 nm, and 450 nm, as described above. In the case where the wavelengths of servo light, recording light, and reproducing light are set to values other than the above, a material having a high reflectance with respect to servo light, and low reflectances with respect to recording light and reproducing light is selected as a material of the servo layer 13.

Referring back to FIG. 1, the spacer layer 14 is made of a UV curable resin, or a transparent film member coated with an adhesive agent on both surfaces thereof.

The recording layer 15 is made of a material having a property that the refractive index of the recording layer 15 is changed by two-photon absorption. In this embodiment, recording light and reproducing light are simultaneously irradiated on the recording layer 15 in performing a recording operation. Two-photon absorption is induced by irradiating recording light on the recording layer 15, while irradiating reproducing light on the recording layer 15, thereby raising the energy level of the recording layer 15. In view of this, a two-photon absorbing material having the above optical function is used as a material of the recording layer 15.

An exemplified material of the recording layer 15 is a diarylethene derivative or a spiropyran derivative. In this embodiment, since the wavelengths of recording light and reproducing light are respectively set to 800 nm and 450 nm, cis-1,2-dicyano-1,2-bis(2,4,5-trimethyl-3-thienyl) can be used as an exemplified material of the diarylethene derivative, and 1,3,3-trimethylindolino-6-nitrobenzopyrylospiran can be used as an exemplified material of the spiropyran derivative. In the case where wavelengths other than 800 nm and 450 nm are selected as the wavelengths of recording light and reproducing light, the material of the recording layer is changed depending on the selected wavelengths. Other examples of the recording layer 15 are a photopolymer, a photorefractive crystal, a fluorescent pigment, and a fluorescent material containing ZnS or ZnO.

A spiral groove is formed in the servo layer 13, and accordingly a spiral land is formed on an area between the groove areas. The structures of the groove and the land will be described later referring to FIGS. 5A through 7. As will be described later, a layer structure for identifying a servo layer, and pits for holding physical information relating to five recording layers 15 constituting a set of layers with a servo layer 13 are formed in a part of the servo layer 13.

The recording layers 15 are each made of a uniform and flat film having a predetermined thickness. The spacer layers 14 are respectively formed between the servo layer 13 and the recording layer 15, between the surface layer 12 and the recording layer 15, and between the respective two recording layers 15 adjacent to each other in the laminated direction.

The optical disc 10 is fabricated by, for example, a following procedure.

First, a stamper having a groove structure to be transferred to a servo layer 13 is prepared. A substrate 11 having a transferred groove structure on a surface thereof is formed by injection molding with use of the stamper. Then, a reflective film made of a high reflective material such as aluminum is formed by vapor deposition on the surface of the substrate 11 where the groove structure is transferred. Accordingly, a servo layer 13 is formed on the substrate 11. In this way, the servo layer 13 serving as a first layer is made of a high reflective material such as aluminum, without using the aforementioned niobium pentoxide.

Subsequently, a uniform spacer layer 14 is formed by coating a UV curable resin on the servo layer 13 as the first layer by a spin coat method or the like, and irradiating UV light on the servo layer 13. Then, a recording layer 15 is formed by subjecting the spacer layer 14 to vapor deposition using the diarylethene derivative or the spiropyran derivative. The thickness of the recording layer 15 is in the range from about 0.1 to 1.5 µm. Then, another uniform spacer layer 14 is formed by coating the UV curable resin by a spin coat method or the like, and irradiating UV light on the recording layer 15. In this example, the thickness of the spacer layer 14 is in the range from about 1 to 8 µm. In this example, the spacer layer 14 is made of a UV curable resin. Alternatively, a spacer layer 14 may be formed by attaching a transparent film member (e.g. a seal member made of polyvinyl alcohol), with both surfaces thereof being coated with an adhesive agent, to a recording layer 15.

Thereafter, the step of forming a recording layer 15 and a spacer layer 14 is repeated according to the above procedure, thereby laminating a predetermined number of recording layers 15 and spacer layers 14. Then, the UV curable resin is coated on a recording layer 15 in forming a spacer layer 14 immediately before a servo layer 13 of a succeeding set of layers is formed, and UV light is irradiated from the side of the substrate 11 in a state that the stamper is pressed against the spacer layer 14. Accordingly, the UV curable resin is cured. Thereafter, the spacer layer 14 carrying a transferred groove structure on a surface thereof is formed by peeling the stamper from the UV cured resin layer.

After the spacer layer 14 is formed in this way, a servo layer 13 of the succeeding set of layers is formed by subjecting the surface of the spacer layer 14 to vapor deposition using the niobium pentoxide. Then, a uniform spacer layer 14 is formed by coating the UV curable resin on the servo layer 13 by a spin coat method or the like, and irradiating UV light on the servo layer 13. Thereafter, the step of forming a recording layer 15 and a spacer layer 14 is repeated according to the above procedure, thereby laminating a predetermined number of recording layers 15 and spacer layers 14.

The above procedure is repeated until immediately before a surface layer 12 is formed. Thus, four sets of layers each constituted of the servo layer 13, the spacer layers 14, and the recording layers 15 are formed. Thereafter, a surface layer 12 is formed by coating the UV curable resin on the last-formed spacer layer 14, and irradiating UV light on the spacer layer 14. In the case where the last-formed spacer layer 14 is made of the UV curable resin, in place of a seal member, the last-formed spacer layer 14 may serve as the surface layer 12 by increasing the thickness of the last-formed spacer layer 14.

Figure 3:
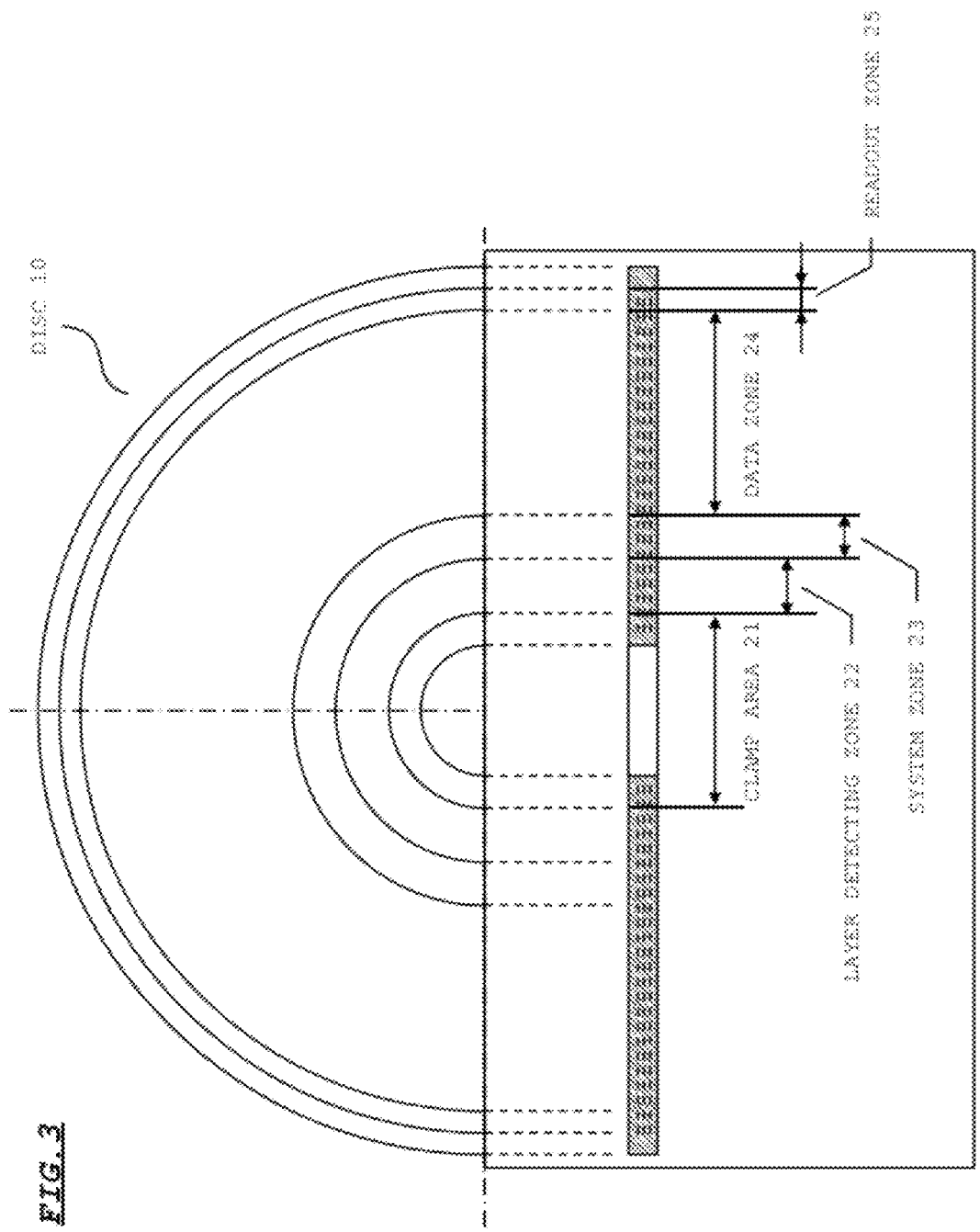
FIG. 3 is a diagram showing an area format of the optical disc in accordance with the embodiment of the present invention.

FIG. 3 is a diagram showing an area format of the optical disc 10. As shown in FIG. 3, an area of the optical disc 10 is divided into a clamp area 21, a layer detecting zone 22, a system zone 23, a data zone, 24, and a readout zone 25 radially from the inner circumference to the outer circumference of the disc 10. The aforementioned groove structure is formed from the layer detecting zone 22 to the readout zone 25.

The clamp area 21 is an area for chucking the optical disc 10 on a turntable in an optical disc apparatus. The layer detecting zone 22 is a zone for detecting order of a servo layer 13 counted from the surface layer 12.

Figure 4:
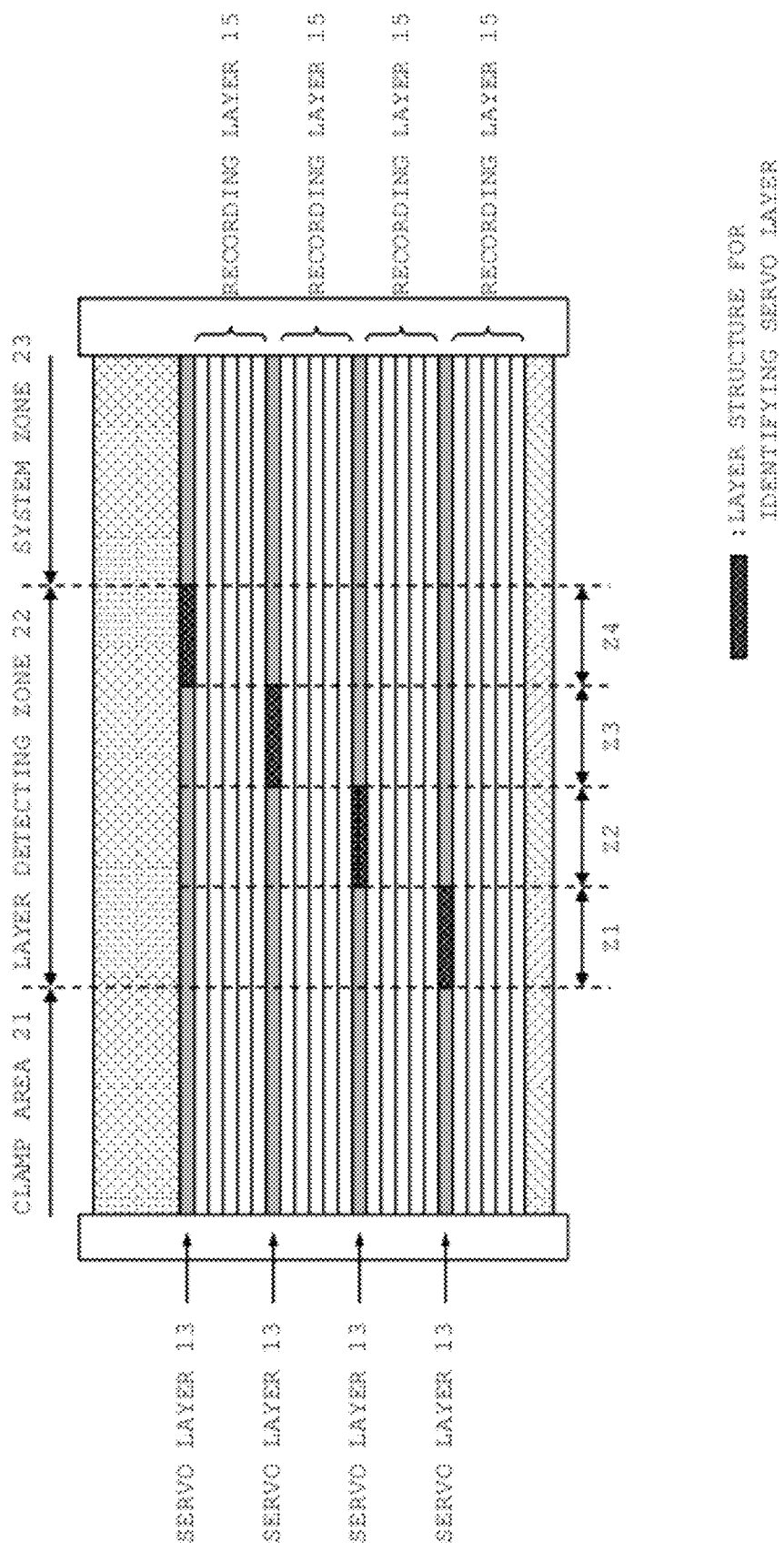
FIG. 4 is a diagram showing an arrangement (sectional structure) of a layer detecting zone in accordance with the embodiment of the present invention.

FIG. 4 is a diagram showing an arrangement (sectional structure of the disc) of the layer detecting zone 22. As shown in FIG. 4, the layer detecting zone 22 is divided into four zones Z1, Z2, Z3, and Z4 radially from the inner circumference to the outer circumference of the disc 10. Among the four zones, the innermost zone Z1 is allocated as a zone for detecting the first servo layer 13 which is counted from the surface layer 12. Likewise, the second zone Z2, the third zone Z3, and the fourth zone Z4 from the inner circumferential side are respectively allocated as zones for detecting the second servo layer 13, the third servo layer 13, and the fourth servo layer 13 which is counted from the surface layer 12. The innermost zone Z1 corresponding to the first servo layer 13 with respect to the surface layer 12 has a layer structure for identifying a servo layer. Likewise, the zones Z2, Z3, and Z4 corresponding to the second, the third, and the fourth servo layers 13 which is counted from the surface layer 12 each has a layer structure for identifying a servo layer.

In this example, the layer structure for identifying a servo layer is formed by, for example, intermittently erasing a servo layer 13 in the circumferential direction of the disc. For instance, the layer structure is formed by intermittently burning off a servo layer 13 by high-power laser light after the servo layer 13 is formed.

In the above arrangement, if laser light is converged on a layer structure for identifying a servo layer in a state that the optical disc 10 is rotated, the intensity of reflection light is modulated depending on an erasing pattern of a servo layer 13. Accordingly, if the scanning position of laser light is successively shifted from the zone Z1 to the zone Z4 after the laser light is focused on a servo layer 13, the intensity of reflection light is modulated when the laser light is shifted to a zone having a layer structure for identifying a servo layer. Accordingly, monitoring a zone out of the zones Z1 through Z4, which shows modulation of the intensity of reflection light, enables to identify order of the servo layer 13 counted from the surface layer 12. For instance, if the intensity of reflection light is modulated when the laser light is shifted to the zone Z1, the servo layer 13 is identified as the first servo layer 13 which is counted from the surface layer 12.

The layer structure for identifying a servo layer may hold a servo layer ID for identifying each servo layer depending on an erasing pattern of a servo layer 13. The modification is advantageous in accurately identifying each servo layer 13. In this example, the layer structures for identifying a servo layer are formed by intermittently burning off the zones Z1 through Z4 corresponding to the servo layers 13 with high-power laser light. Alternatively, a stamper having pits or asperities representing a corresponding zone may be prepared for each of the servo layers 13, and the pits or the asperities may be transferred to an area corresponding to each servo layer 13 out of the zones Z1 through Z4, by using the corresponding stamper for use in forming each servo layer 13. In the modification, zones other than the zone corresponding to the servo layer 13 may have a flat shape without pits or asperities.

Further alternatively, layer information relating to a servo layer may be recorded in the zones Z1 through Z4 by: forming, in the zone Z1, a pit train or an address structure indicating L0, as a structure for identifying a servo layer; and similarly, forming, in the zones Z2, Z3, and Z4, pit trains or address structures indicating L1, L2, and L3, as structures for identifying a servo layer.

Further alternatively, discrimination among the recording layers 15 may be performed by utilizing the layer detecting zone 22. Signals are not recorded in the recording layers 15 of an unrecorded disc, in other words, a disc is in a blank state. In performing a recording operation, signals for detecting the recording layers 15 are recorded in the recording layers 15 at the layer detecting zone 22 in the order from a laser light incident side. For instance, a signal "00" indicating that the recording layer 15 is the first recording layer 15 formed in combination with the first servo layer 13 (L0) is singly or serially recorded in the first recording layer 15 with respect to the laser light incident side. Likewise, a signal "01" indicating that the recording layer 15 is the second recording layer 15 formed in combination with the first servo layer 13 (L0) is singly or serially recorded in the second recording layer 15 with respect to the laser light incident side. Repeating the recording processing in the similar manner as described above with respect to all the recording layers 15 enables to record layer information for identifying a recording layer 15 in the recording layers 15 at the layer detecting zone 22 of a blank disc. Reproducing the layer information recorded as described in performing a reproducing operation enables to acquire the layer information relating to the recording layers, as well as the servo layer to be reproduced.

Alternatively, the layer information relating to each recording layer 15 may be held in the recording layers 15 at the system zone 23, in addition to the layer detecting zone 22. Further alternatively, the layer information may be included in a part of a logic address to be recorded in the data zone 24 corresponding to the recording layers 15. For instance, in the case where the data zone 24 is radially divided into a plurality of areas, the layer information may be recorded in boundary portions between the divided areas. Recording the layer information in a plurality of sites other than the layer detecting zone 22 enables to eliminate the need of accessing to the layer detecting zone 22 each time information is reproduced. This enables to suppress a seek time in layer discrimination. Thus, the layer discrimination can be smoothly and speedily performed, even in the case where the layer is randomly accessed among the recording layers. This enables to realize a stable reproducing operation.

Similarly to the arrangement that the layer detecting zone 22 is divided into the zones Z0 through Z4 in discriminating the layer among the servo layers 13, in discriminating the layer among the recording layers 15, the layer detecting zone 22 may also be divided into the number of (in this embodiment, five) zones corresponding to the number of existing recording layers between the servo layers, and a signal may be recorded in a zone corresponding to a recording layer, thereby discriminating the layer among the recording layers 15.

Referring back to FIG. 3, the system zone 23 holds information for controlling a recording/reproducing operation. Pit trains for holding physical information (recording density, reproducing laser power, recording laser power, and the like) of five recording layers 15 constituting a set of layers with a servo layer 13 are spirally formed in the system zone 23 corresponding to the servo layers 13. The pit trains are formed in an inner peripheral area of the system zone 23. In the inner peripheral area, a groove is not formed, and merely the pit trains are formed. A groove is formed in an outer peripheral area continuing from the pit train area. Information (recording layer ID) for identifying a recording layer 15, and information for administering recording with respect to a recording layer 15, for example, information indicating whether recording is allowed with respect to a recording layer 15, a succeeding recording start address, information relating to a test-recording operation at the time of laser power adjustment, and information indicating a file structure of recorded user information, are recorded in the system zone 23 corresponding to each recording layer 15.

The user information is recorded in the data zone 24. In this embodiment, the user information is recorded in the recording layers 15 at the data zone 24 by following a scanning trajectory corresponding to a groove 31, as well as a scanning trajectory corresponding to a land 30. Information indicating that a detected area corresponds to an outer peripheral portion of the disc is recorded in the readout zone 25.

Figure 5A:
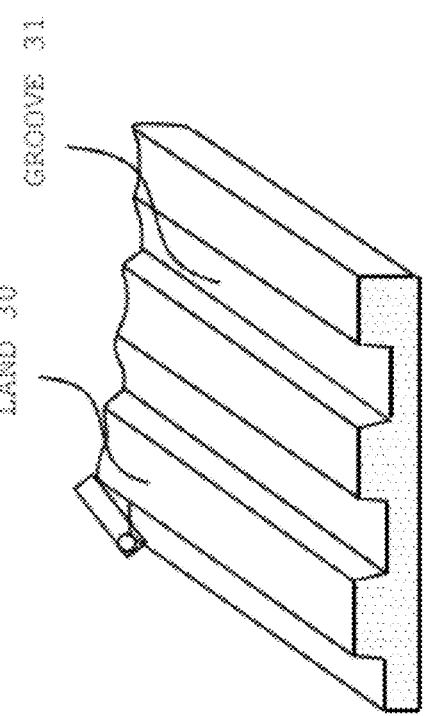
FIGS. 5A, 5B, and 5C are perspective views showing a structure of a groove area in a servo layer in accordance with the embodiment of the present invention.
Figure 5B:
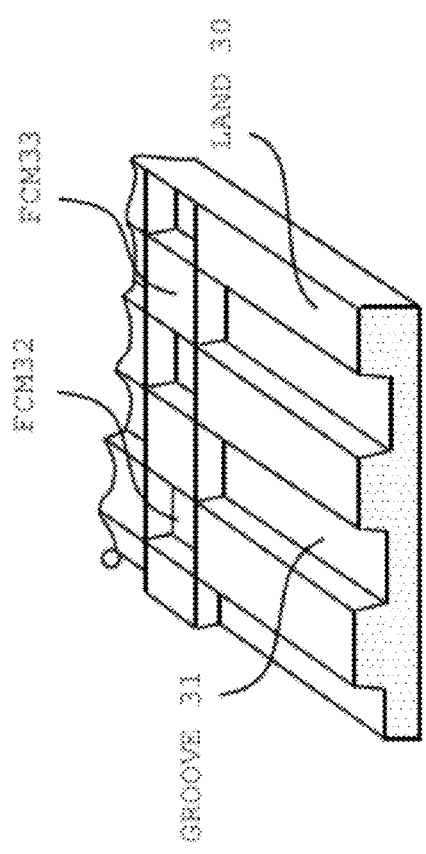
Figure 5C:
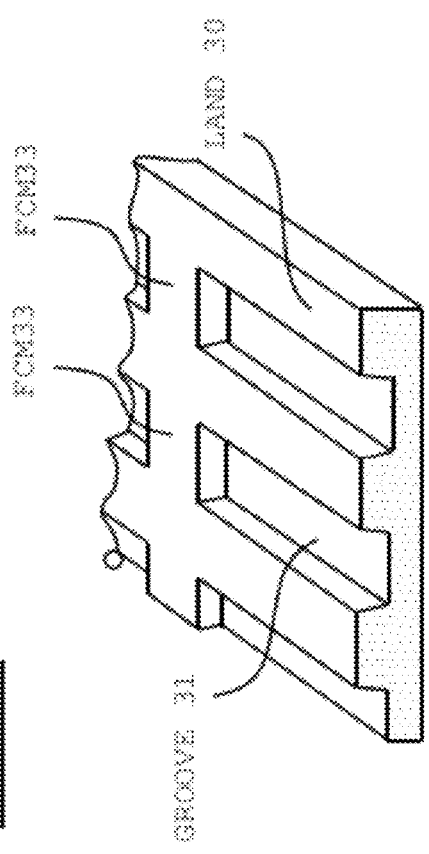

FIGS. 5A, 5B, and 5C are diagrams showing a structure of a land and a groove. As shown in FIG. 5A, the land 30 and the groove 31 are each formed with a predetermined pitch. In this embodiment, the land 30 and the groove 31 have widths identical to each other. This is because, as described above, information is recorded in the recording layers 15 along the scanning trajectory corresponding to the groove 31, as well as the scanning trajectory corresponding to the land 30. In the case where information is recorded along one of the scanning trajectories corresponding to the land 30 and the groove 31, the width of the other one of the scanning trajectories may be minimized to increase the recording capacity.

As shown in FIG. 5B, FCMs (Fine Clock Marks) 32 and 33 are formed on the land 30 and the groove 31 at a predetermined interval. In FIG. 5B, the depth of the FCM 32 is the same as the depth of the groove 31, and the height of the FCM 33 is the same as the height of the land 30.

If a beam spot reaches an FCM 32 or an FCM 33 during a scanning operation of the land 30 or the groove 31, the intensity level of reflection light is changed. In this embodiment, as will be described later, a detection signal of the FCM 32 or 33 is generated based on an output from a photodetector for receiving reflection light, and a clock signal for recording/reproducing information is generated based on the detection signal.

As described above, in the case where a plurality of recording layers 15 are laminated in the optical disc 10, normally, decentering changes with respect to each of the recording layers 15. In view of this, if a clock signal is generated simply based on a radial position of a disc, there is a case that the clock signal may be greatly displaced from a proper condition with respect to each of the recording layers 15. In view of this, in this embodiment, a clock signal is generated based on a detection signal from the FCM 32 and 33, and is used as a clock signal for recording/reproducing information with respect to a recording layer 15 constituting a set of layers with a servo layer 13. This enables to record/reproduce operation with respect to each of the recording layers 15 with a proper clock signal.

Alternatively, as shown in FIG. 5C, FCMs 33 may be formed solely on a groove 31, in place of the structure shown in FIG. 5B. In the modification, since a perimeter portion of a beam spot in the disc radial direction is overlapped with an FCM 33 on the groove 31, while the beam spot scans a land 30, the intensity level of reflection light is changed. Accordingly, a detection signal of the FCM 33 and a clock signal can be generated, based on an output from a photodetector for receiving reflection light during a scanning operation of the land 30.

Structures for holding physical addresses of the land 30 and the groove 31 are formed on the land 30 and the groove 31, in addition to the FCMs 32 and 33. Specifically, as shown in FIG. 6A, a first address portion 34 and a second address portion 35 are formed by wobbling a wall surface at each of boundaries between an area of the land 30 and an area of the groove 31 in the disc radial direction. In this example, the first address portion 34 and the second address portion 35 sequentially formed on the groove 31 hold the same physical address. Accordingly, different physical addresses are held in the first address portion 34 and the second address portion 35 formed sequentially on the land 30.

Specifically, in the arrangement of FIG. 6A, the first address portion 34 on an area of the land 30 holds the physical address of the right-side area of the groove 31, and the second groove portion 35 on the area of the land 30 holds the physical address of the left-side area of the groove 31. In this arrangement, the physical address on the land 30 is defined by the second address portion 35 on the land 30, and the first address portion 34 on the land 30 is used to acquire the physical address held in the second address portion 35, in the case where the second address portion 35 is not read. In other words, in this arrangement, the physical address on the land 30 is acquired by adding/subtracting an address difference between the first address portion 34 and the second address portion 35 on the land 30 to/from the physical address read and acquired from the first address portion 34 on the land 30.

Two wobble shapes (the first address portion 34 and the second address portion 35) are formed at two sites with respect to one physical address for the following reason. Specifically, in the case where a plurality of layers are laminated in the optical disc 10 as described above, if a foreign matter or the like is intruded in a part of one of the layers, a signal derived from a servo layer 13, which is formed rearward of the site where the foreign matter is intruded with respect to the laser light incident side, may be deteriorated due to the foreign matter. In this occasion, if the foreign matter is intruded in the site corresponding to an area on the servo layer 13 where the physical address is formed, it is highly likely that the physical address could not be read due to the foreign matter. In view of this, in this embodiment, two wobble shapes (the first address portion 34 and the second address portion 35) are formed at two sites with respect to one physical address to acquire a physical address from the other one of the two sites, if a physical address is not read from one of the two sites.

In this example, the physical address is held at two sites. Alternatively, the physical address may be held at three or more sites. In the modification, however, the ratio of wobble shapes with respect to a recording area is increased, and the recording capacity of a disc is reduced by the increased ratio. In view of this, it is preferable to set the number of repeating the physical address to a proper value, considering reduction of the recording capacity.

In the foregoing, the same physical address is held in the first address portion 34 and the second address portion 35 sequentially formed on the groove 31. Alternatively, the same physical address may be held in the first address portion 34 and the second address portion 35 sequentially formed along the land 30. Further alternatively, the same physical address may not be necessarily held in the first address portion 34 and the second address portion 35, but information capable of properly acquiring a physical address at a targeted position may be held based on the information acquired from either one of the first address portion 34 and the second address portion 35.

A structure for detecting a tilt state (an inclined state of a servo layer 13 with respect to a laser optical axis) of a targeted position is formed on the groove 31 in addition to the first address portion 34 and the second address portion 35. Specifically, as shown in FIG. 6B, a tilt mark portion 36 (a first tilt mark 36a and a second tilt mark 36b) is formed by increasing or decreasing the groove width in the disc radial direction by a predetermined size along the groove 31. In this example, the area of the land 30 adjacent to the position where the first tilt mark 36a is formed has a smaller width, and the area of the land 30 adjacent to the position where the second tilt mark 36b is formed has a larger width. Accordingly, by forming the first tilt mark 36a and the second tilt mark 36b, a tilt mark portion 36 formed by increasing or decreasing the groove width in the disc radial direction by a predetermined size is also formed along the land 30.

Scanning by a beam spot on the first tilt mark 36a and the second tilt mark 36b generates an S-shaped curve on a radial push-pull signal depending on an inclined state of a servo layer 13 with respect to a laser optical axis. A tilt state of the servo layer 13 at the scanning position is detected based on a waveform state of the S-shaped curve. In this embodiment, a tilt error signal (TIE signal) is generated based on an S-shaped curve generated on a radial push-pull signal. Then, optical axes of laser light to be irradiated on a servo layer 13 and recording layers 15 constituting a set of layers with the servo layer 13 are tilted based on the signal, and the tilts of each of the laser optical axes with respect to the servo layer 13 and the recording layers 15 are corrected.

As described above, in the case where a plurality of recording layers 15 are formed in the optical disc 10, normally, a tilt state differs with respect to each of the recording layers 15. In this embodiment, tilts of each of laser light with respect to a servo layer 13, and recording layers 15 constituting a set of layers with the servo layer 13 are suppressed based on a tilt error signal derived from the servo layer 13. In this example, since the distance between a servo layer 13, and five recording layers 15 constituting a set of layers with the servo layer 13 is small in the laminated direction, tilt states of the servo layer 13 and the five recording layers 15 are similar to each other. Accordingly, tilts of recording light and reproducing light with respect to five recording layers 15 constituting a set of layers with a servo layer 13 can be smoothly suppressed by correcting the tilts of the five recording layers 15, based on a tilt error signal derived from the servo layer 13.

The tilt mark may have a structure other than the above structure. For instance, the FCMs 33 shown in FIG. 5C may be used as the tilt mark. In the modification, since there is no need of separately forming a tilt mark forming area, the recording capacity of the optical disc 10 can be increased.

It is preferable to form tilt marks along the entire circumference of a disc from the aspect of tilt correction. However, it is desirable to restrict a tilt mark forming area to a predetermined area from the aspect of securing a recording capacity. In the case where securing a recording capacity is prioritized, for instance, a recording area (an area constituted of the system zone 23, the data zone 24, and the readout zone 25) may be divided into a plurality of areas in the disc radial direction, and tilt marks may be formed at positions where the areas are divided. In the modification, for instance, a tilt of a targeted recording/reproducing position is corrected, based on a tilt error signal detected from a tilt mark near the recording/reproducing position.

Figure 7:
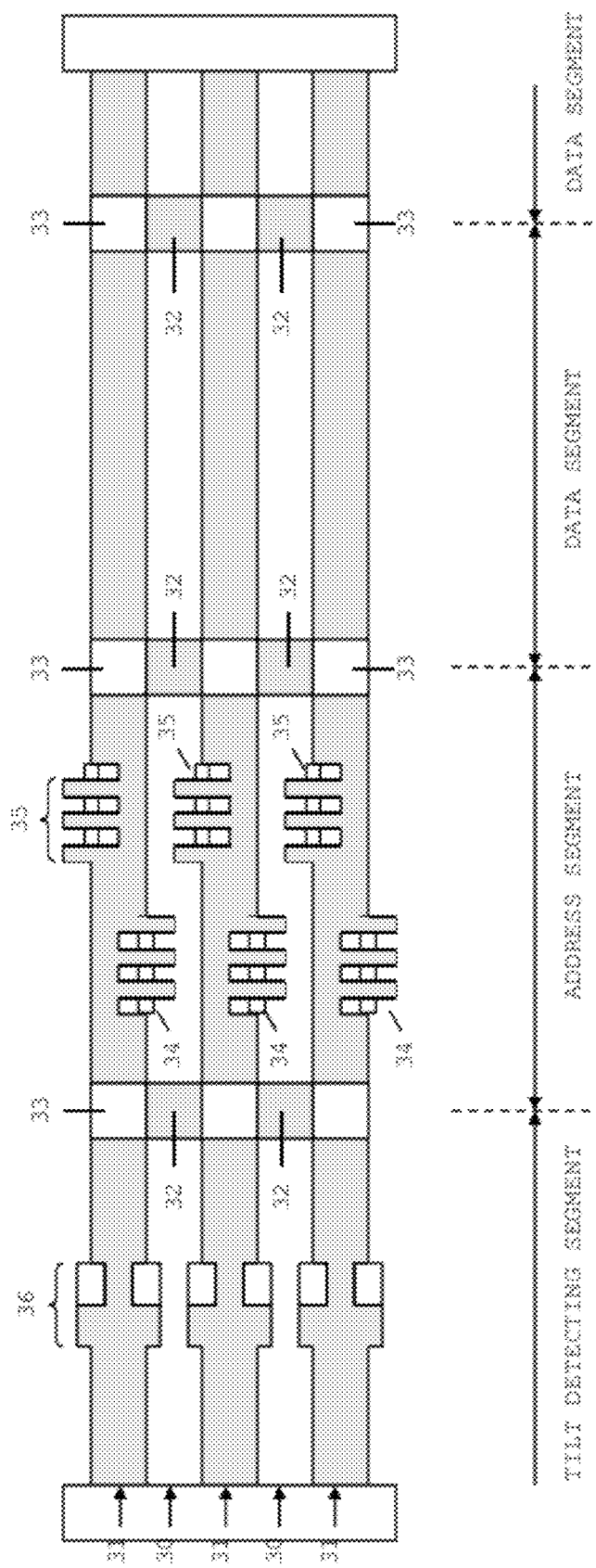
FIG. 7 is a plan view showing the structure of the groove area in the servo layer in accordance with the embodiment of the present invention.

FIG. 7 is a diagram showing a physical format of a groove forming area in the servo layer 13.

As shown in FIG. 7, the land 30 and the groove 31 are divided into a plurality of segments by the FCMs 32 and 33. The segments divided by the FCMs 32 and 33 are allocated as one of a tilt detecting segment, an address segment, and a data segment. The tilt mark portion 36 is formed in the tilt detecting segment, and the first address portion 34 and the second address portion 35 are formed in the address segment. An area of the land 30 and an area of the groove 31 which are not subjected to wobbling are formed in the data segment. The aforementioned physical information is recorded in the recording layers 15 at the system zone 23, at a position corresponding to the data segment, and user information is recorded in the recording layers 15 at the data zone 24, at a position corresponding to the data segment.

As shown in FIG. 7, a predetermined number of data segments are formed on the groove forming area of the servo layer 13, following the tilt detecting segment and the address segment. After the data segments are ended, another tilt detecting segment and another address segment are formed, followed by a predetermined number of data segments.

Next, an arrangement of an optical disc apparatus for recording/reproducing information with respect to the optical disc 10 is described.

First, FIGS. 8A and 8B are diagrams showing an arrangement (optical system) of the optical pickup device to be loaded in an optical disc apparatus. FIG. 8A is a plan view of the optical system, wherein quarter wavelength plates 106 and 117, a servo objective lens 107, and a recording/reproducing objective lens 118 are not illustrated. FIG. 8B is a side view of the optical system, wherein a rise-up mirror 105, the quarter wavelength plates 106 and 117, the servo objective lens 107, and the recording/reproducing objective lens 118 are illustrated.

Referring to FIGS. 8A and 8B, the reference numerals 101 through 109 indicate elements constituting an optical system for irradiating servo light on the optical disc 10, and the reference numerals 111 through 121 indicate elements constituting an optical system for irradiating recording light and reproducing light on the optical disc 10.

The semiconductor laser 101 emits servo light of 635 nm wavelength. A collimator lens 102 collimates servo light emitted from the semiconductor laser 101 into parallel light. A polarized beam splitter 103 transmits substantially the whole of servo light to be incident from the collimator lens 102, and reflects substantially the whole of servo light to be incident from the beam expander 104. The beam expander 104 is constituted of a combination of a concave lens and a convex lens. One of the concave lens and the convex lens is driven in the optical axis direction by an actuator 133. In this example, the actuator 133 includes a motor and a worm gear, and is driven in accordance with a servo signal for use in correcting aberration of servo light on a servo layer 13.

The rise-up mirror 105 reflects servo light to be incident from the beam expander 104 in the direction of the servo objective lens 107. The rise-up mirror 105 also reflects recording light and reproducing light to be incident from the beam expander 116 in the direction of the recording/reproducing objective lens 118.

The quarter wavelength plate 106 converts servo light to be incident from the rise-up mirror 105 into circularly polarized light, and converts servo light (reflection light from the optical disc 10) to be incident from the servo objective lens 107 into linearly polarized light orthogonal to a polarization direction toward the servo objective lens 107. The servo objective lens 107 converges servo light on the servo layer 13.

An anamorphic lens 108 introduces astigmatism to servo light (reflection light from the optical disc 10) reflected on the polarized beam splitter 103. A photodetector 109 receives servo light converged on the anamorphic lens 108, and outputs a detection signal. The photodetector 109 has a four-division sensor for receiving servo light. The photodetector 109 is arranged at such a position that the optical axis of servo light passes a point of intersection of sensor dividing lines of the four-division sensor.

A femto-second laser 111 emits recording light of 800 nm wavelength. The recording light is emitted from the femto-second laser 111 as parallel light. A semiconductor laser 112 emits reproducing light of 450 nm wavelength. A collimator lens 113 collimates reproducing light emitted from the semiconductor laser 112 into parallel light. A dichroic prism 114 combines recording light emitted from the femto-second laser 111 and reproducing light emitted from the semiconductor laser 112.

A polarized beam splitter 115 transmits substantially the whole of recording light and reproducing light to be incident from the dichroic prism 114, and reflects substantially the whole of reproducing light out of the recording light and the reproducing light to be incident from the beam expander 116. Specifically, a wavelength-selective light polarization film capable of acting solely on reproducing light is formed on the polarized beam splitter 115.

The beam expander 116 is constituted of a combination of a concave lens and a convex lens, and one of the concave lens and the convex lens is driven in the optical axis direction by an actuator 134. In this example, the actuator 134 includes a motor and a worm gear, and is driven in accordance with a servo signal for pulling recording light and reproducing light onto a recording layer 15 (hereinafter, the recording layer is specifically called as a "targeted recording layer 15") to be recorded or reproduced.

Recording light and reproducing light transmitted through the beam expander 116 are reflected toward the recording/reproducing objective lens 118 by the rise-up mirror 105. The quarter wavelength plate 117 converts recording light and reproducing light to be incident from the rise-up mirror 105 into circularly polarized light, and converts recording light and reproducing light (reflection light from the optical disc 10) to be incident from the recording/reproducing objective lens 118 into linearly polarized light orthogonal to the polarization direction toward the recording/reproducing objective lens 118.

The recording/reproducing objective lens 118 converges recording light and reproducing light on the targeted recording layer 15. A hologram for converging recording light and reproducing light at an identical position on the optical disc 10 is formed on a surface of the recording/reproducing objective lens 118. In other words, focal lengths of recording light and reproducing light having different wavelengths from each other are adjusted by the hologram.

The condenser lens 119 converges reproducing light (reflection light from the optical disc 10) reflected on the polarized beam splitter 115. A pinhole plate 120 has a very small pinhole, and the pinhole is formed at such a position that the pinhole coincides with a focus position of reproducing light reflected on the targeted recording layer 15. In this arrangement, a primary part of reproducing light reflected on the targeted recording layer 15 is transmitted through the pinhole, and a primary part of reproducing light (stray light) reflected on the recording layers 15 other than the targeted recording layer 15 is blocked by the pinhole plate 120, without transmitting through the pinhole.

An APD (Avalanche Photo Diode) 121 receives reproducing light transmitted through the pinhole plate 120, and outputs a reproducing signal. The APD 121 is a photodetector capable of detecting a minute change in light amount.

The quarter wavelength plates 106 and 117, the servo objective lens 107, and the recording/reproducing objective lens 118 are mounted on a holder 131 in common. In this example, the holder 131 is driven in a focusing direction, a tracking direction, and a tilt direction by an objective lens actuator 132. The objective lens actuator 132 is constituted of a well-known coil and magnetic circuit, and the coil is mounted on the holder 131. In response to supply of a servo signal to the objective lens actuator 132, the quarter wavelength plates 106 and 117, the servo objective lens 107, and the recording/reproducing objective lens 118 are displaced in the focusing direction, the tracking direction, and the tilt direction integrally with the holder 131.

Figure 9A:
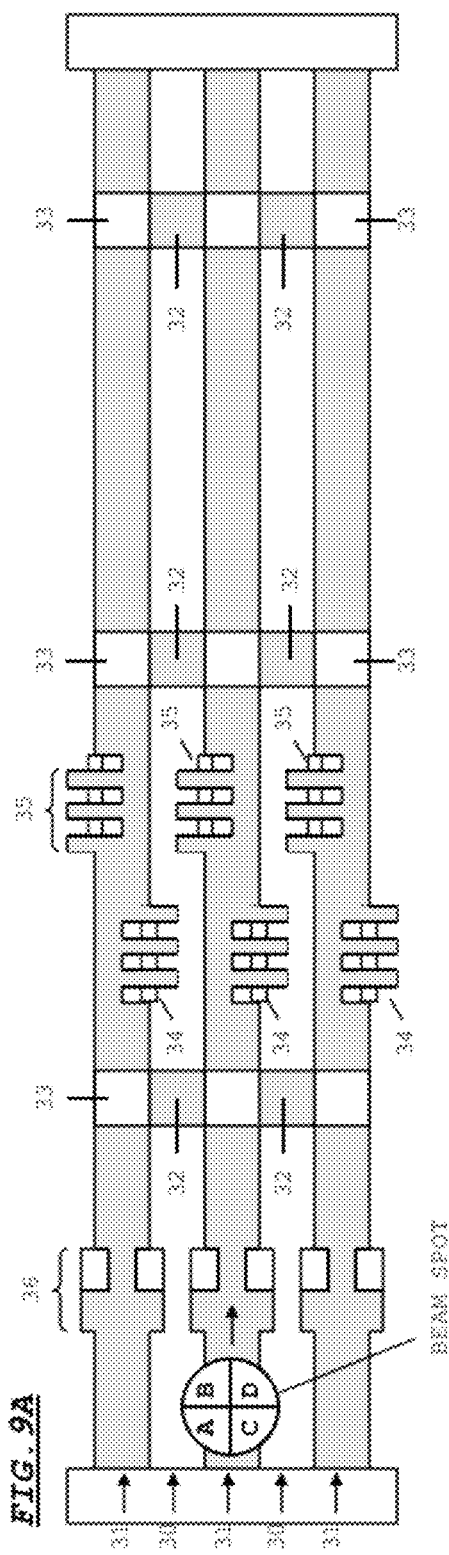
FIGS. 9A, 9B, and 9C are diagrams for describing a method for generating various servo signals in accordance with the embodiment of the present invention.
Figure 9C:
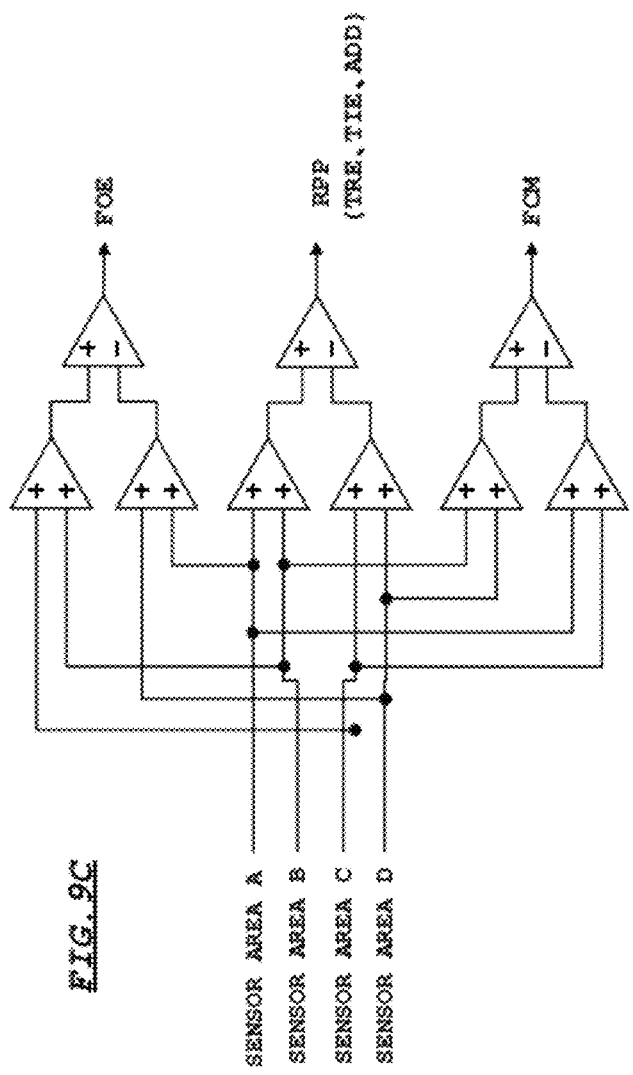
Figure 9B:
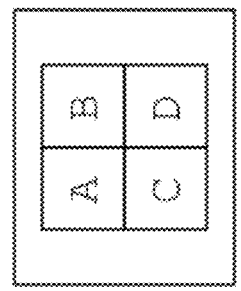

FIG. 9B is a diagram showing a four-division sensor arranged in the photodetector 109. FIG. 9C is a diagram showing a circuit arrangement (computing circuit) for generating a focusing error signal (FOE signal), a radial push-pull signal (RPP signal), and a fine clock mark signal (FCM signal) based on outputs from the four-division sensor. FIG. 9A is a diagram showing a scanning example of a beam spot (servo light) with respect to a groove forming area in a servo layer 13.

As shown in FIG. 9C, the computing circuit includes six adder circuits and three subtractor circuits. Reflection light from four divided areas "A", "B", "C", and "D" of a beam spot shown in FIG. 9A is guided to sensor areas "A", "B", "C", and "D" of the four-division sensor shown in FIG. 9B, respectively. In this example, assuming that detection signals to be outputted from the sensor areas "A", "B", "C", and "D" are respectively "a", "b", "c", and "d", a focusing error signal (FOE signal) is generated by a signal computation: FOE=(b+c)−(a+d). A radial push-pull signal (RPP signal) is generated by a signal computation: RPP=(a+b)−(c+d), and a fine clock mark signal (FCM signal) is generated by a signal computation: FCM=(b+d)−(a+c).

If a beam spot is displaced in the radial direction from a center of the groove 31, a radial push-pull signal (RPP signal) has a polarity and a magnitude depending on a direction and an amount of the displacement. A tracking error signal (TRE signal) is generated by extracting the polarity and the magnitude.

If a beam spot passes a tilt mark portion 36 in a state that a servo layer 13 is tilted, an S-shaped curve appears on a radial push-pull signal (RPP signal) depending on a tilt state of the servo layer 13. A tilt error signal (TIE signal) is generated by comparing and computing an amplitude peak value of the S-shaped curve.

Further, when the beam spot passes a first address portion 34 and a second address portion 35, the radial push-pull signal (RPP signal) is modulated depending on the wobble shapes of the first address portion 34 and the second address portion 35. A physical address at the beam spot scanning position is acquired by extracting a modulated component with use of a frequency filter, and demodulating the extracted modulated component.

Next, an arrangement of an optical disc apparatus is described referring to FIG. 10.

As shown in FIG. 10, the optical disc apparatus includes an encoder 201, a modulating circuit 202, a laser driving circuit 203, an optical pickup device 204, a signal amplifying circuit 205, a demodulating circuit 206, a decoder 207, an address reproducing circuit 208, a servo circuit 209, a clock generating circuit 210, and a controller 211.

The encoder 201 encodes inputted recording data by, for example, adding an error correction code, and outputs the encoded data to the modulating circuit 202. The modulating circuit 202 modulates the inputted recording data as determined, generates a recording signal, and outputs the recording signal to the laser driving circuit 203.

In performing a recording operation, the laser driving circuit 203 supplies a drive signal in accordance with a recording signal from the modulating circuit 202 to the femto-second laser 111 in the optical pickup device 204, and supplies drive signals to the semiconductor lasers 101 and 112, respectively, in the optical pickup device 204 to cause the semiconductor lasers 101 and 112 to emit servo light and reproducing light with predetermined powers. In performing a reproducing operation, the laser driving circuit 203 supplies drive signals to the semiconductor lasers 101 and 112, respectively, in the optical pickup device 204 to cause the semiconductor lasers 101 and 112 to emit servo light and reproducing light with predetermined powers.

In this example, the laser power in performing a recording/reproducing operation is controlled based on a control signal from the controller 211. In performing a recording operation, the controller 211 performs a test-recording operation with respect to a test-write area, while changing the power of recording light, monitors an APD signal (detection signal from the APD 121) to be inputted from the signal amplifying circuit 205 in performing the test-recording operation, and sets a power of recording light which makes the level of the APD signal equal to or larger than a predetermined threshold value, as the power in performing the recording operation. In performing a reproducing operation, the controller 211 monitors an APD signal to be inputted from the signal amplifying circuit 205, while changing the power of reproducing light, and adjusts the power of reproducing light so that the level of the APD signal becomes equal to or larger than a predetermined threshold value.

The optical pickup device 204 has the optical system shown in FIGS. 8A and 8B. The signal amplifying circuit 205 includes the computing circuit shown in FIG. 9C, and a circuit arrangement for amplifying a detection signal from the APD 121 in the optical pickup device 204, and removing a noise from the detection signal. The demodulating circuit 206 demodulates an APD signal inputted from the signal amplifying circuit 205 to generate reproducing data, and outputs the reproducing data to the decoder 207. The decoder 207 decodes data inputted from the demodulating circuit 206 by, for example, error correction, and outputs the decoded data to a post-stage circuit.

The address reproducing circuit 208 extracts a frequency component, depending on a first address portion 34 and a second address portion 35, from a radial push-pull signal (RPP signal) inputted from the signal amplifying circuit 205, demodulates the extracted frequency component, and acquires a physical address. The acquired physical address is supplied to the controller 211. In the case where a physical address is not reproducible from one of the first address portion 34 and the second address portion 35, the address reproducing circuit 208 reproduces a physical address from the other one of the first address portion 34 and the second address portion 35, as described above.

The servo circuit 209 generates a focusing servo signal and a tracking servo signal based on a focusing error signal (FOE signal) and a tracking error signal (TRE signal) inputted from the signal amplifying circuit 205, and outputs the focusing servo signal and the tracking servo signal to the objective lens actuator 132 in the optical pickup device 204. The servo circuit 209 also generates a tilt servo signal based on an S-shaped curve on a radial push-pull signal (RPP signal) inputted from the signal amplifying circuit 205, and outputs the tilt servo signal to the objective lens actuator 132 in the optical pickup device 204. The servo circuit 209 also generates a motor servo signal based on a fine clock mark signal (FCM signal) inputted from the signal amplifying circuit 205, and outputs the motor servo signal to a disc driving motor. In addition to the above, the servo circuit 209 drives the actuators 133 and 134 in the optical pickup device 204 in performing a recording/reproducing operation, which will be described later.

The clock generating circuit 210 generates a recording clock signal and a reproducing clock signal based on a fine clock mark signal (FCM signal) inputted from the signal amplifying circuit 205, and supplies the recording clock signal and the reproducing clock signal to the respective circuits.

The controller 211 includes a CPU (Central Processing Unit), and an internal memory. Various data are stored in the internal memory, and the controller 211 controls the respective parts in accordance with a predetermined program.

FIGS. 11A and 11B are conceptual diagrams showing recording and reproducing operations.

In the case where recording light and reproducing light are irradiated on a targeted recording layer 15, first, the objective lens actuator 132 is driven and controlled with servo light being emitted. Then, as shown in FIG. 11A, the focus position of servo light is pulled onto a servo layer 13 (hereinafter, the servo layer is specifically called as a "targeted servo layer 13") constituting a set of layers with the targeted recording layer 15. In performing the pulling operation, the beam expander 116 is set to an initial state, and the focus positions of recording light and reproducing light are, for example, positioned on the targeted servo layer 13, as well as the servo light.

Thereafter, the beam expander 116 is driven by the number of steps required for shifting the focus positions of recording light and reproducing light to the targeted recording layer 15. Accordingly, the focus positions of recording light and reproducing light are shifted to the targeted recording layer 15. Then, the reproducing light is emitted in this state, and the beam expander 116 is minutely driven and controlled to optimize the APD signal. Accordingly, the reproducing light is focused on the targeted recording layer 15, whereby reproduction with respect to the targeted recording layer 15 is allowed.

In performing a recording operation, recording light is emitted in the above state. In performing the recording operation, the recording light is modulated (turned on/off) depending on a recording signal. Accordingly, the recording light and the reproducing light are simultaneously irradiated on a targeted recording layer 15, whereby recording with respect to the targeted recording layer 15 is performed.

As described above, in performing a recording/reproducing operation, a focusing servo signal, a tracking servo signal, and a tilt servo signal are applied to the objective lens actuator 132, and the servo objective lens 107 and the recording/reproducing objective lens 118 are integrally driven in the focusing direction, the tracking direction, and the tilt direction. Accordingly, beam spots of recording light and reproducing light scan the targeted recording layer 15 along a track corresponding to the groove or the land on the targeted servo layer 13.

Figure 12:
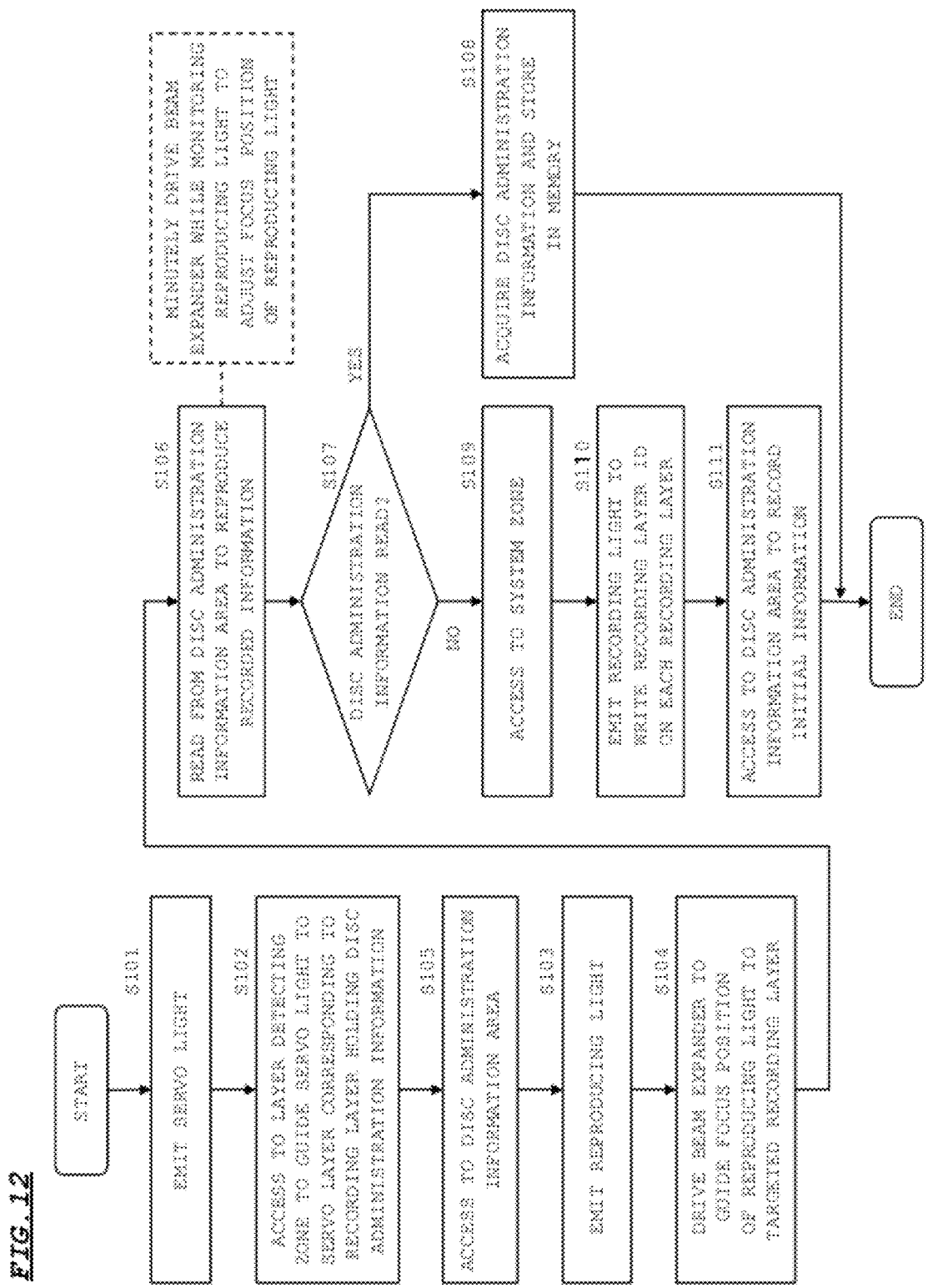
FIG. 12 is a flowchart showing an initial operation in accordance with the embodiment of the present invention.

FIG. 12 is a flowchart showing an initial operation to be performed prior to a recording/reproducing operation. In this example, disc administration information for administering the whole of an disc has been recorded in a predetermined recording layer. The disc administration information includes information necessary for a recording/reproducing operation such as information for discriminating a recorded recording layer from an unrecorded recording layer, and physical addresses of a last-recorded recording layer and a final recorded position on the last-recorded recording layer.

In performing an initial operation, first, servo light is emitted in a state that the optical disc 10 is subjected to servo control for rotation (Step S101). Accordingly, the optical pickup device 204 accesses to the layer detecting zone 22. Then, the servo light is pulled onto a servo layer 13 constituting a set of layers with the recording layer 15 holding the disc administration information, based on a structure for identifying a servo layer, which is formed in the servo layer 13 (Step S102).

Then, the optical pickup device 204 accesses to the recorded position of the disc administration information (Step S105). Thereafter, reproducing light is emitted (Step S103). Then, as described above, the beam expander 116 is driven to pull the reproducing light onto the targeted recording layer 15 holding the disc administration information (Step S104).

Thereafter, an operation of reading the disc administration information from the targeted recording layer 15 is performed (Step S106). In performing the reading operation, as described above, the beam expander 116 is subjected to servo control to optimize the APD signal.

If it is judged that the disc administration information has been read by the reading operation (YES in Step S107), the read disc administration information is stored in the memory of the controller 211 (Step S108), and the initial operation is terminated. If, on the other hand, it is judged that the disc administration information has not been read (NO in Step S107), it is judged that the optical disc 10 is unused, and an initializing operation from Step S109 and thereafter is performed.

Specifically, the optical pickup device 204 accesses to the system zone 23 (Step S109), and a recording layer ID for identifying a recording layer is successively written in the system zone 23 corresponding to all the recording layers 15 in the optical disc 10 (Step S110). In other words, as described above, pulling servo light onto a servo layer 13 and pulling reproducing light onto a recording layer 15 are successively performed, and the reproducing light is pulled onto each of the recording layers 15. Then, after the light pulling is completed, recording light is emitted, and recording layer IDs are recorded in the recording layers 15 on which the reproducing light has been pulled. In this example, recording layer IDs may be recorded by, for example, using a method for recording a series of identical marks having the lengths 1T, 2T, 3T, 4T, and 5T to five recording layers 15 constituting a set of layers with each servo layer 13, respectively, in place of a method for recording information such as the recording layer numbers.

Alternatively, the recording layer IDs may be recorded at a boundary position between the system zone 23 and the data zone 24, a boundary position between the data zone 24 and the readout zone 25, and the like, in addition to the system zone 23. Further alternatively, in the case where the data zone 24 is divided into a plurality of zones in the disc radial direction, and each zone is divided into sectors, the recording layer IDs may be recorded in vacant areas of the zones, which are left unused after sector division. The modification is advantageous in acquiring the recording layer IDs with a less seek time without depending on a position to be accessed by the optical pickup device 204.

As described above, after the recording layer IDs are recorded in the system zone 23 corresponding to all the recording layers 15, the optical pickup device 204 accesses again to the recording layer 15 in which the disc administration information is to be held, and initial information is recorded in the recording layer 15 (Step S111). Accordingly, the initializing operation with respect to the optical disc 10 is completed, and the initial operation is terminated.

FIG. 13A is a flowchart to be implemented in performing a recording operation.

When a recording operation is started, the optical disc 10 is subjected to servo control for rotation, and servo light is emitted (Step S201). Then, the optical pickup device 204 accesses to the layer detecting zone 22, and the servo light is pulled onto a servo layer 13 constituting a set of layers with a targeted recording layer 15, based on a structure for identifying a servo layer, which is formed in the servo layer 13 (Step S202).

Thereafter, the optical pickup device 204 is shifted to a recording start position, based on address information acquired from the servo layer 13 (Step S203). Thereafter, reproducing light is emitted (Step S204). Then, the beam expander 116 is driven to pull the reproducing light onto the targeted recording layer 15, as described above (Step S205).

In this way, after the reproducing light is positioned at the recording start position on the targeted recording layer 15, recording light is emitted to successively record user information on the targeted recording layer 15 from the recording start position (Step S206). Then, if it is judged that recording of the user information is terminated (YES in Step S207), the recording operation is terminated.

FIG. 13B is a flowchart to be implemented in performing a reproducing operation.

When a reproducing operation is started, the optical disc 10 is subjected to servo control for rotation, and servo light is emitted (Step S301). Then, the optical pickup device 204 accesses to the layer detecting zone 22, and the servo light is pulled onto a servo layer 13 constituting a set of layers with a targeted recording layer 15, based on a structure for identifying a servo layer, which is formed in the servo layer 13 (Step S302).

Thereafter, the optical pickup device 204 is shifted to a reproducing start position, based on address information acquired from the servo layer 13 (Step S303). Thereafter, reproducing light is emitted (Step S304). Then, as described above, the beam expander 116 is driven to pull the reproducing light onto the targeted recording layer 15 (Step S305).

In this way, after the reproducing light is positioned at the reproducing start position on the targeted recording layer 15, a reading operation with respect to the targeted recording layer 15 is successively performed from the reproducing start position, and the user information is reproduced (Step S306). In performing the reproducing operation, as described above, the beam expander 116 is subjected to servo control to optimize the APD signal. Then, if it is judged that reproduction of the user information is terminated (YES in Step S307), the reproducing operation is terminated.

As described above, in this embodiment, since the servo layers 13 are arranged in the optical disc 10 with a predetermined interval in the laminated direction, there is no likelihood that each servo layer 13 and five recording layers 15 constituting a set of layers with the servo layer 13 are disposed away from each other with a large distance in the laminated direction. Accordingly, high reliability of a servo signal with respect to each of the recording layers 15 can be secured. As a result, beam spots of recording light and reproducing light can be properly scanned on the recording layers.

Further, the servo layer 13 is made of a material (such as niobium pentoxide) having a high reflectance with respect to servo light and low reflectances with respect to recording light and reproducing light. Accordingly, attenuation of recording light and reproducing light generated from the servo layer 13 can be suppressed. Accordingly, recording light and reproducing light can be smoothly and efficiently pulled onto the rearmost recording layer 15, even if a plurality of servo layers 13 are arranged. Thus, recording and reproducing operations can be properly performed with respect to all the recording layers 15.

The embodiment of the present invention is not limited to the above, but various modifications are applicable.

For instance, in the foregoing embodiment, five recording layers 15 are formed in combination with one servo layer 13 to constitute a set of layers. Alternatively, recording layers 15 of the number other than five may be formed in combination with one servo layer 13. If, however, the number of recording layers to be formed in combination with one servo layer is increased, the distance between the servo layer and the recording layers is increased, and the relation between the servo layer and the recording layers becomes weak. In view of this, it is necessary to set the number of recording layers to be formed in combination with one servo layer to such a range capable of realizing smooth servo control.

In the foregoing embodiment, a servo layer is made of a material (such as niobium pentoxide) having a high reflectance with respect to servo light, and low reflectances with respect to recording light and reproducing light. However, in the case where the number of sets of layers each constituted of a servo layer and recording layers is relatively small, and recording light and reproducing light of sufficient powers can be pulled onto a rear recording layer without forming a servo layer of the above material, it is possible to form the servo layer of a semitransparent film or the like. In the above modification, however, forming a servo layer of the above material is advantageous in efficiently pulling recording light and reproducing light onto a rear recording layer, and stabilizing recording and reproducing operations.

In the foregoing embodiment, the beam expander 116 is used to adjust the focus positions of recording light and reproducing light. Alternatively, a liquid crystal element or the like may be used in place of the beam expander 116. In the foregoing embodiment, the focus positions of recording light and reproducing light are aligned to each other. Alternatively, the focus positions of recording light and reproducing light may not necessarily be aligned to each other, and the focus positions of recording light and reproducing light may be displaced from each other in the optical axis direction to simultaneously irradiate the recording light and the reproducing light on a recording layer.

In the foregoing embodiment, a recording operation is performed by simultaneously irradiating recording light and reproducing light on a recording layer 15. Alternatively, a recording operation may be performed by irradiating solely recording light on a recording layer 15. In the modification, the arrangement of the optical pickup device is substantially same as described above, except that control with respect to the femto-second laser 111 and the semiconductor laser 112 is different. Specifically, in performing a recording operation, only the femto-second laser 111 for emitting recording light emits light with an ultra-short pulse, and the semiconductor laser 112 for emitting reproducing light does not emit light. In this arrangement, since the energy level of a recording layer 15 cannot be raised by reproducing light, the emission power of the femto-second layer 111 is increased, as compared with the embodiment. In the case where a recording operation is performed solely with recording light, it is possible to use a two-photon absorbing material substantially the same as the two-photon absorbing material used in the embodiment as a material of the recording layers 15.

Further, the present invention is applicable to a case that the femto-second laser 111 for emitting recording light, and the semiconductor laser 112 for emitting reproducing light are allowed to irradiate light in performing a recording operation, and the recording layers 15 do not absorb light having a wavelength of the reproducing light. In the above case, although both of the femto-second laser 111 and the semiconductor laser 112 emit light, it is the femto-second laser 111 that actually contributes to a recording operation. In this case, since the energy level of the recording layer 15 cannot be raised by reproducing light as described above, the emission power of the femto-second laser 111 is increased, as compared with the embodiment.

Further, the wavelengths of the respective laser light, the materials of the layers, the film thicknesses, and the like are not limited to the above. Furthermore, the arrangements of the optical pickup device 204 and the optical disc apparatus may be changed or modified as necessary.

The embodiment of the present invention may be changed or modified in various ways as necessary, as far as such changes and modifications do not depart from the scope of the claims of the present invention hereinafter defined.

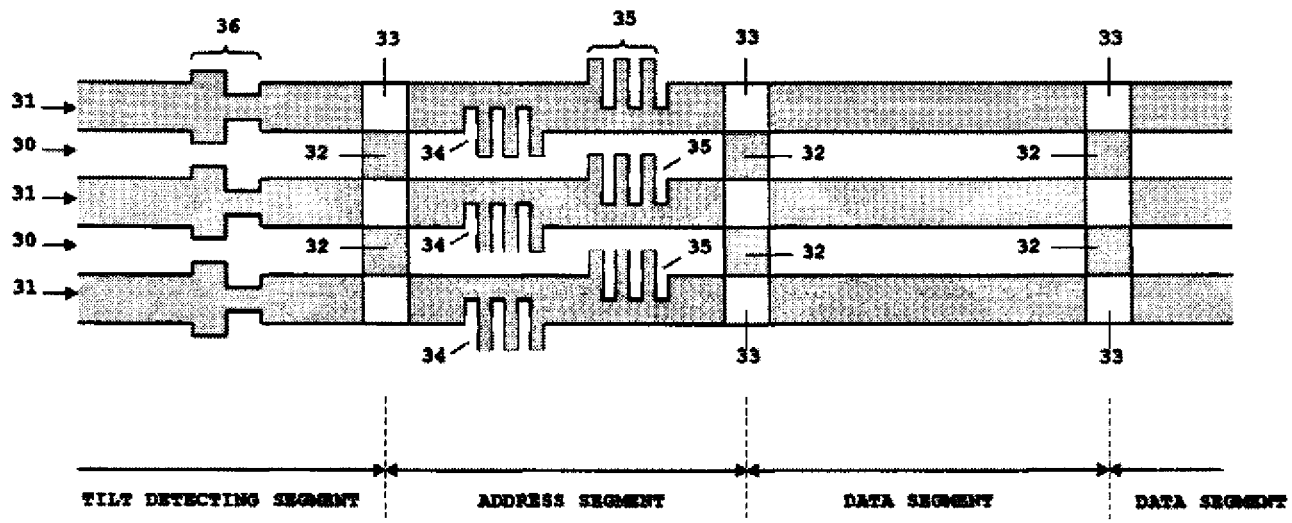

In the drawings, FIG. 8B, the boxes on both ends of the "OPTICAL DISC 10" should be removed:
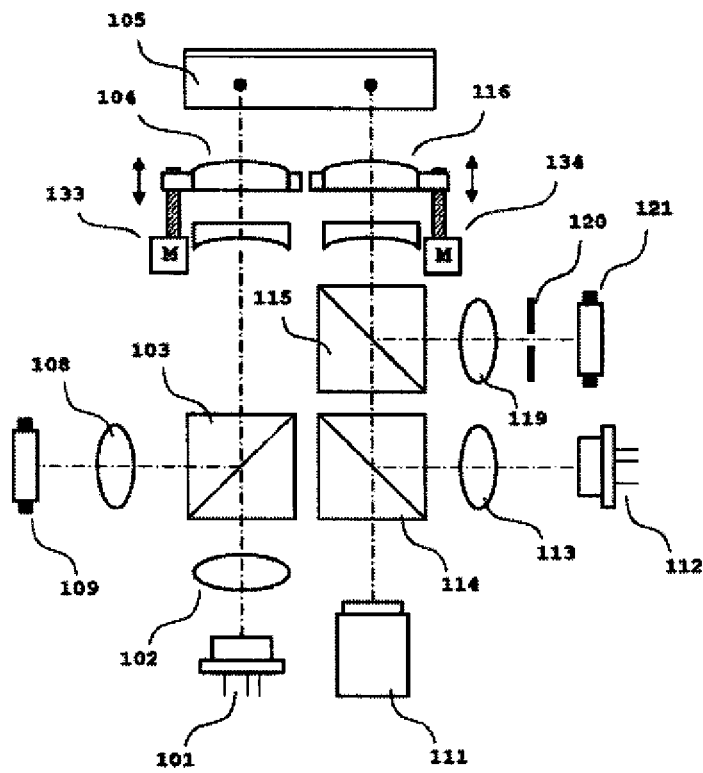
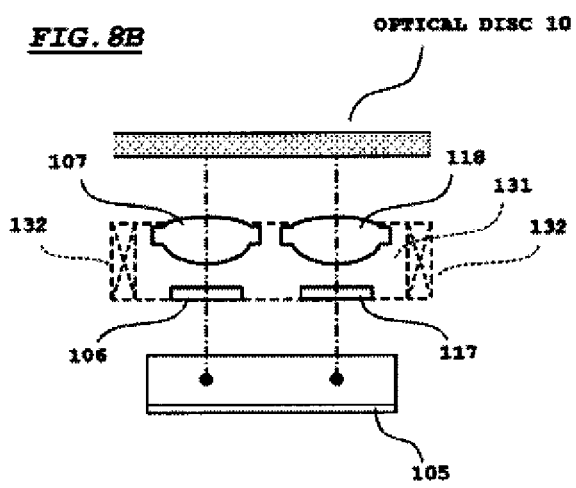

In the drawings, FIG. 9A, the boxes on the left and right ends of drawing and the various boxes at features 36, 34, and 35 should be removed:
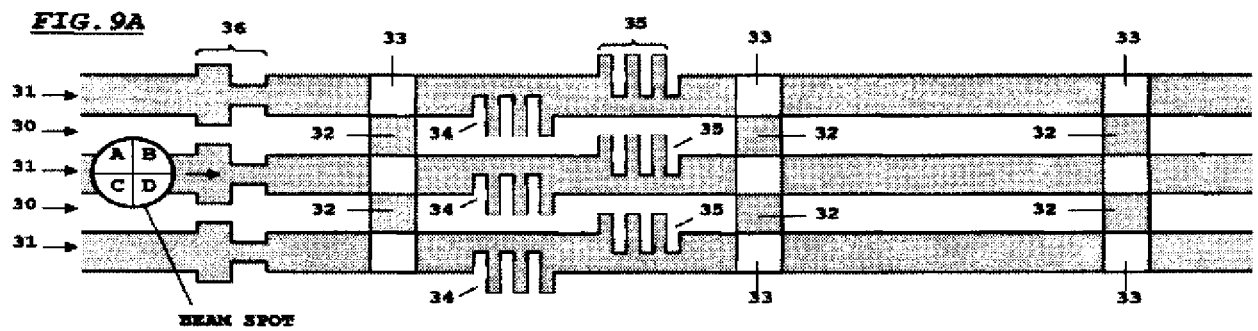
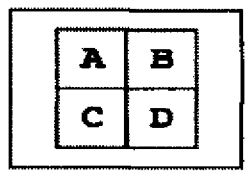
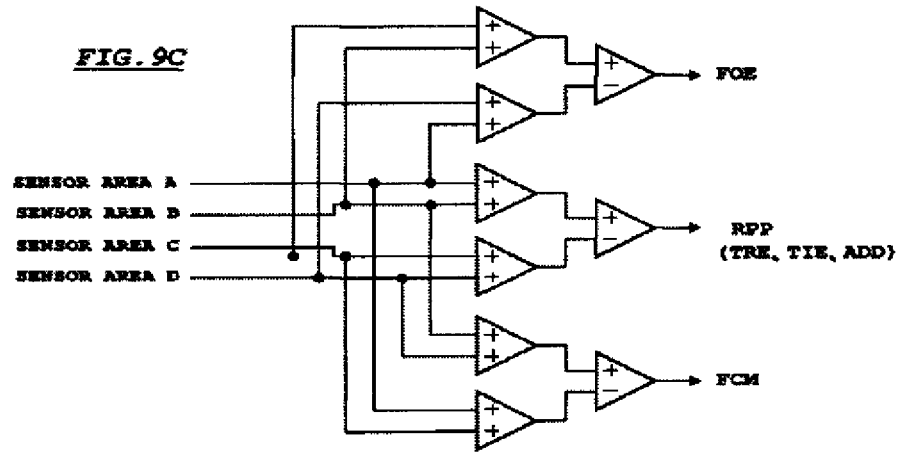

In the drawings, FIGS. 11A-11B, the boxes on the left and right ends of the layers in each of FIGS. 11A and 11B should be removed, the boxes at the bottom in each of FIGS. 11A and 11B over the labels should be removed, and the boxes over the labels in between FIGS. 11A and 11B should be removed:
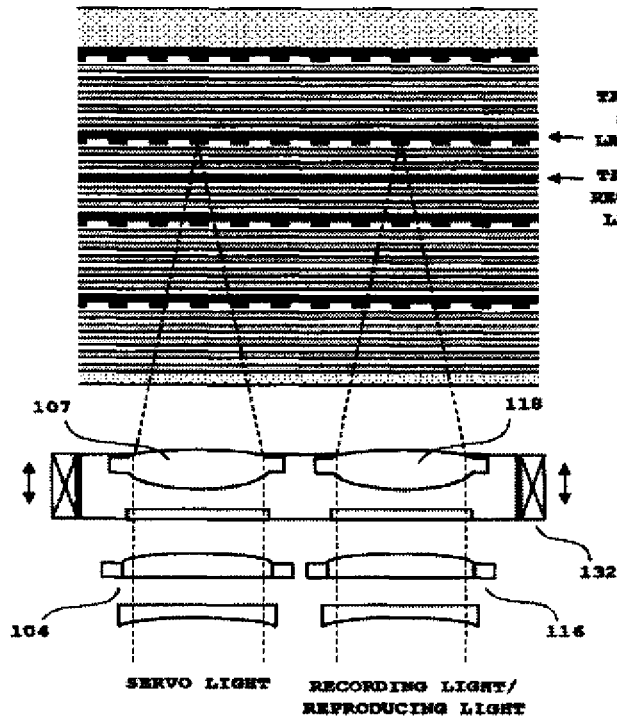
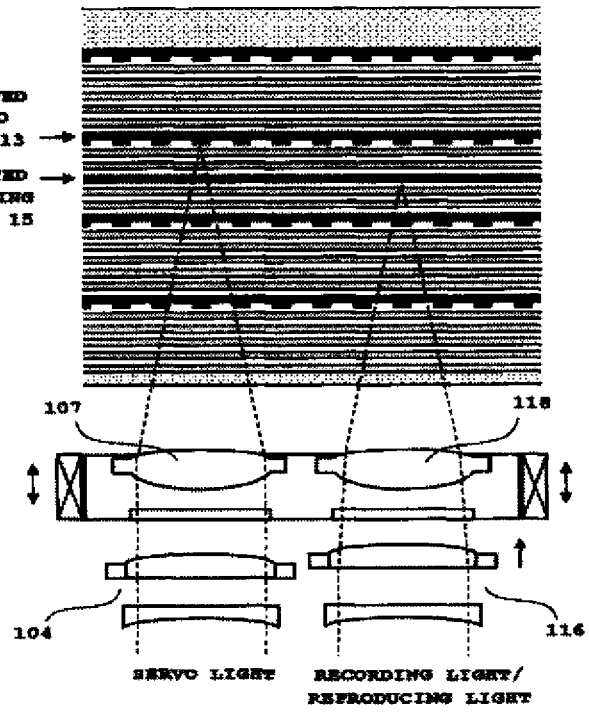

What is claimed is:

1. A recording and reproducing apparatus for recording and reproducing information on and from a recording medium, the recording medium including at least one recording layer on which information is recorded by multi-photon absorption, and a servo layer disposed in a laminated direction with respect to the recording layer and having a track for guiding a beam spot of laser light having a first wavelength for reproducing and a beam spot of laser light having a second wavelength for recording along a scanning trajectory, the servo layer and the at least one recording layer constituting a set of layers, and a plurality of sets of layers being formed in the laminated direction, the recording and reproducing apparatus comprising:

an optical pickup device; and
a servo circuit for controlling the optical pickup device, wherein
the optical pickup device includes:
an optical system for irradiating the laser light having the first wavelength, the laser light having the second wavelength, and laser light having a third wavelength for scanning the servo layer on the recording medium and guiding reflection light of the laser light having the first wavelength reflected from the recording medium, and the reflection light of the laser light having the third wavelength reflected from the recording medium, to a corresponding photodetector; and
an actuator for causing the laser light having the first wavelength and the laser light having the second wavelength to follow the recording layer, and causing the laser light having the third wavelength to follow the servo layer, wherein when recording information on the recording layer, the servo circuit is operable to position the laser light having the third wavelength on the track on the servo layer, based on a detection signal from the photodetector for receiving the laser light having the third wavelength, and to generate a servo signal for causing the laser light having the first wavelength and the laser light having the second wavelength to scan along the scanning trajectory on the recording layer to be recorded so as to supply the servo signal to the actuator, and the optical system includes;
a integrating element for integrating only the laser light having the first wavelength and the laser light having the second wavelength to guide the laser light having the first wavelength and the laser light having the second wavelength to the same position of the recording medium, and
a separating element for separating only the reflection light of the laser light having the first wavelength reflected from the recording medium, and the reflection light of the laser light having the second wavelength reflected from the recording medium, and guiding the separated light of the laser light having the first wavelength to the photodetector for reproducing.

2. The recording and reproducing apparatus according to claim 1, wherein
the servo layer has, on the track, a structure for generating a recording clock and a reproducing clock, and
the recording and reproducing apparatus further includes a clock generating circuit for generating the recording clock and the reproducing clock, based on the detection signal to be obtained in scanning the structure by the laser light having the third wavelength.

3. The recording and reproducing apparatus according to claim 1, wherein
the servo layer has, on the track, a structure for detecting a tilt of the servo layer,
the actuator has an arrangement for correcting tilts of the laser light having the first wavelength and the laser light having the second wavelength with respect to the recording layer, and an arrangement for correcting a tilt of the laser light having the third wavelength with respect to the servo layer, and
the servo circuit is operable to generate a tilt servo signal for suppressing the tilts, based on the detection signal to be obtained in scanning the structure by the laser light having the third wavelength so as to supply the tilt servo signal to the actuator.

4. The recording and reproducing apparatus according to claim 1, wherein
the servo layer has, on the track, a first structure for detecting a scanning address, and a second structure for detecting the scanning address in the case where the scanning address is not acquired from the first structure, and
the recording and reproducing apparatus further includes an address generating circuit for generating address information based on the detection signal to be obtained in scanning the first structure and the second structure by the laser light having the third wavelength.

5. The recording and reproducing apparatus according to claim 1, wherein
a zone for detecting a layer is allocated on each of the servo layers, on an identical area in an in-plane direction, a structure for detecting the each servo layer is formed on the zone on the each servo layer at such a position that the structures are not overlapped with each other in the laminated direction, and in performing a recording operation or a reproducing operation, the zone on the each servo layer is scanned by the laser light having the third wavelength to identify the scanned servo layer from the plurality of servo layers by discriminating a position in the zone, at which a detection signal corresponding to the structure for detecting the each servo layer is obtained.

\* \* \* \* \*

UNITED STATES PATENT AND TRADEMARK OFFICE
CERTIFICATE OF CORRECTION

| | | |
|---|---|---|
| PATENT NO. | : 8,238,215 B2 | |
| APPLICATION NO. | : 12/541648 | |
| DATED | : August 7, 2012 | |
| INVENTOR(S) | : Morio Nakatani et al. | |

It is certified that error appears in the above-identified patent and that said Letters Patent is hereby corrected as shown below:

On the Title page, illustrative figures 8A and 8B should be substituted with the replacement figures 8A and 8B on attached page.

In the drawings, FIG. 1, the boxes on the left and right ends of the layers should be removed, and the box at the bottom of the drawing over the labels should be removed:

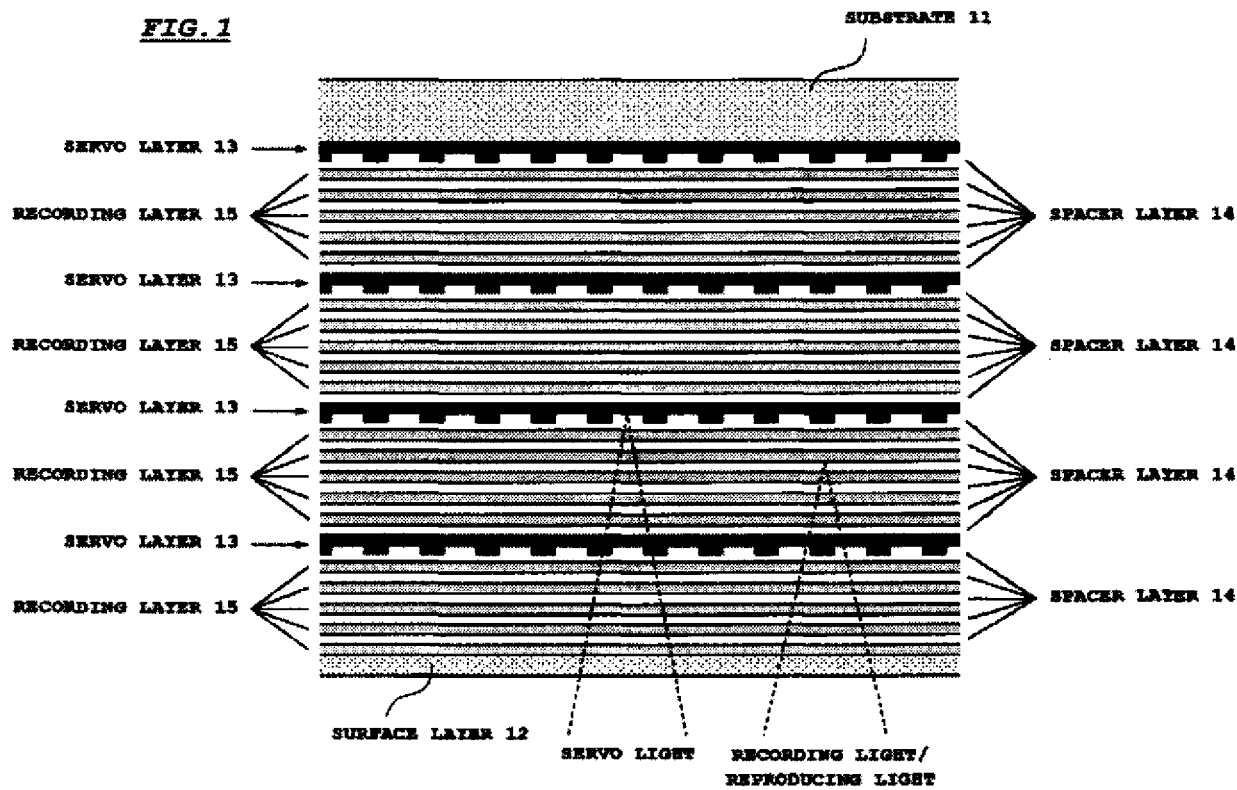

Signed and Sealed this
Fourth Day of December, 2012

David J. Kappos
*Director of the United States Patent and Trademark Office*

CERTIFICATE OF CORRECTION (continued)

U.S. Pat. No. 8,238,215 B2

In the drawings, FIG. 2, the boxes around the various legend labels should be removed:

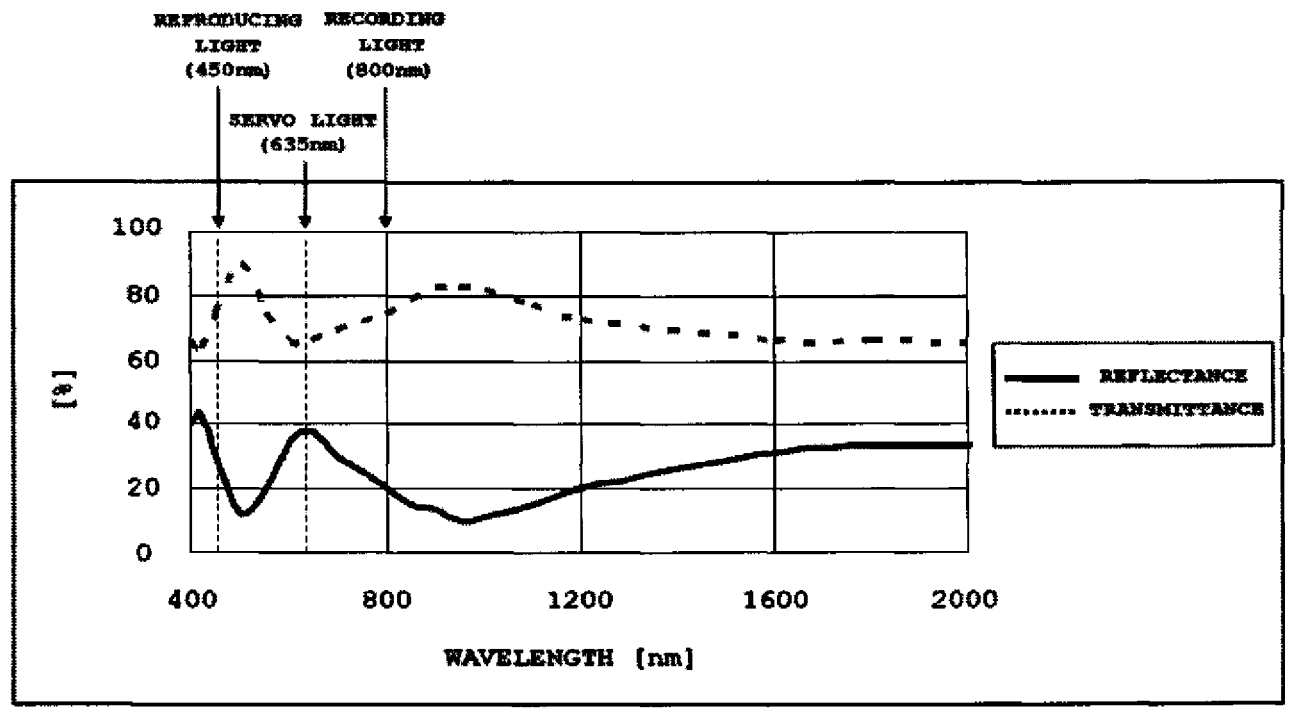

In the drawings, FIG. 3, the box at the bottom of the drawing should be removed:

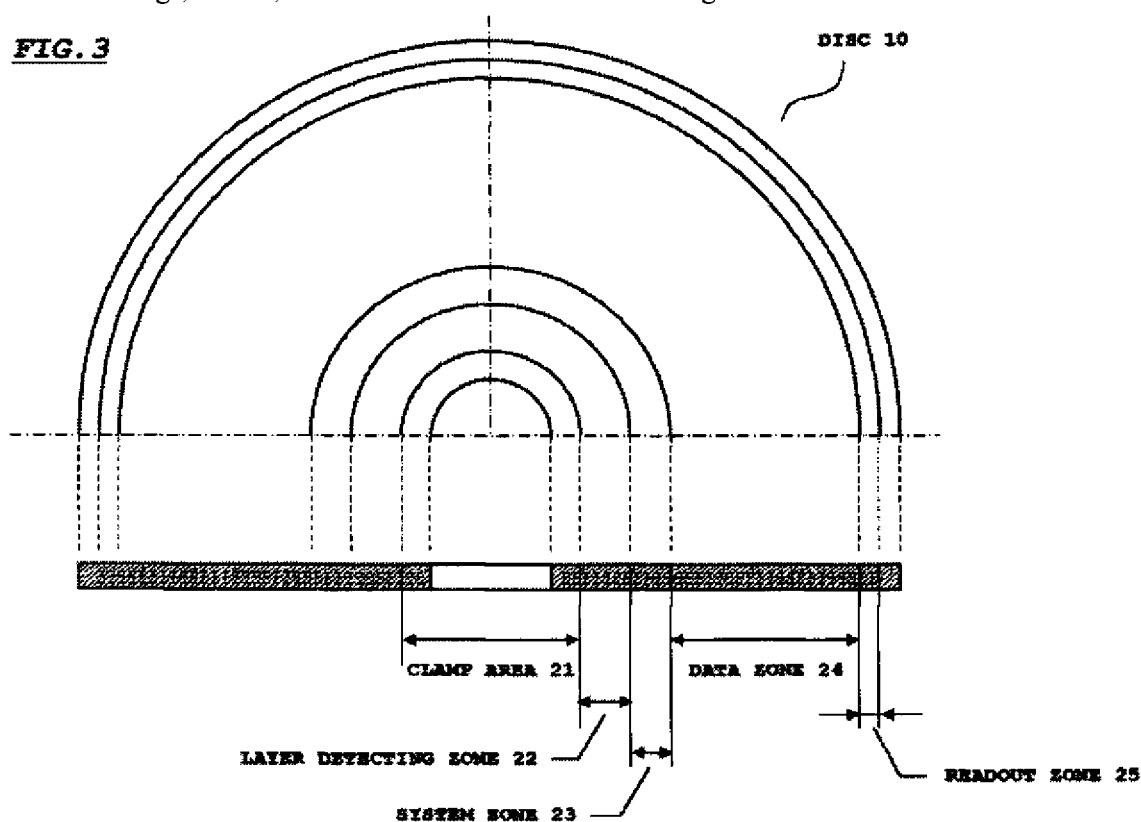

In the drawings, FIG. 4, the boxes on the left and right ends of the layers should be removed:
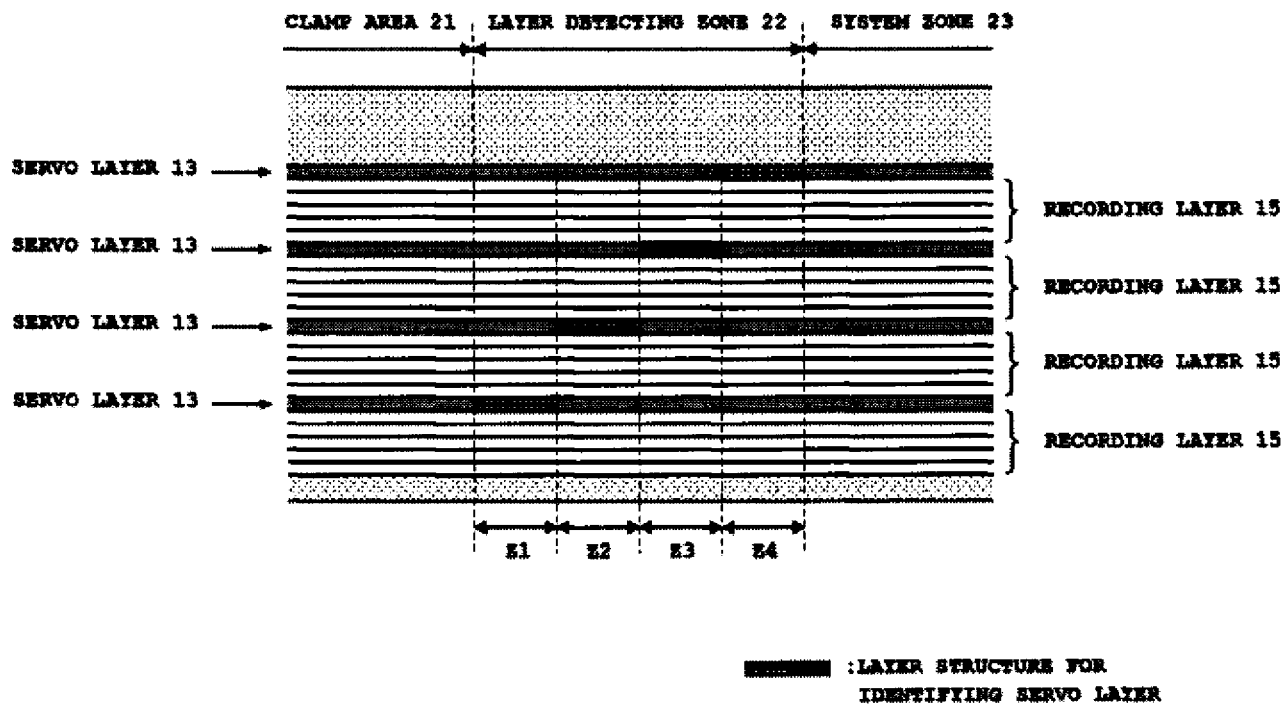

CERTIFICATE OF CORRECTION (continued)
U.S. Pat. No. 8,238,215 B2

In the drawings, FIGS. 5A-5C, the box and circle in the upper left in FIG. 5A should be removed; the circle in the upper left in FIG. 5B should be removed; and the circle in the upper left in FIG. 5C should be removed:

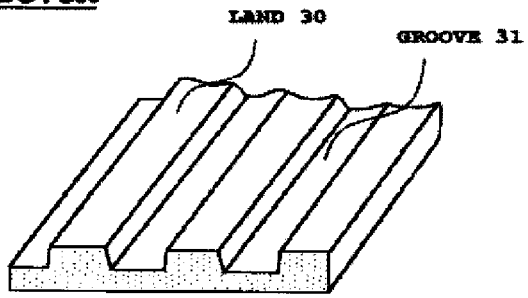

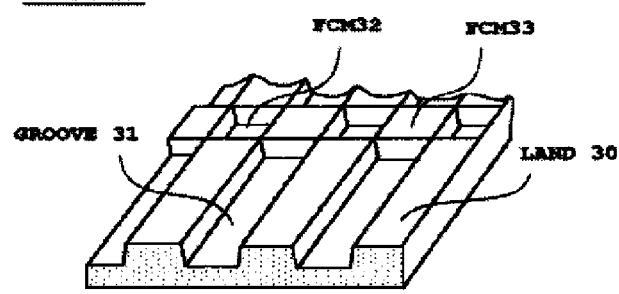

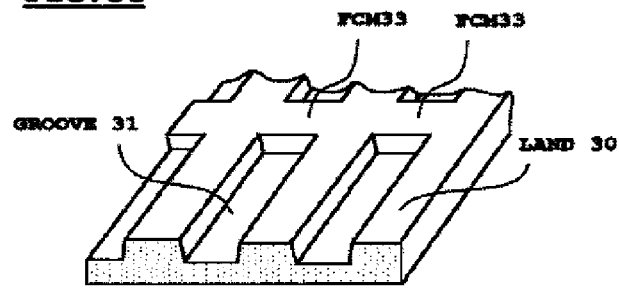

In the drawings, FIG. 7, the boxes on the left and right ends of drawing and the various boxes at features 36, 34, and 35 should be removed: